US009866072B2

(12) United States Patent
Kikuchi et al.

(10) Patent No.: US 9,866,072 B2
(45) Date of Patent: Jan. 9, 2018

(54) WIRELESS POWER TRANSMISSION SYSTEM

(71) Applicant: Panasonic Intellectual Property Management Co., Ltd., Osaka (JP)

(72) Inventors: Satoru Kikuchi, Osaka (JP); Tsutomu Sakata, Osaka (JP); Eiji Takahashi, Nara (JP); Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/271,047

(22) Filed: Sep. 20, 2016

(65) Prior Publication Data

US 2017/0098965 A1 Apr. 6, 2017

Related U.S. Application Data

(60) Provisional application No. 62/236,315, filed on Oct. 2, 2015.

(30) Foreign Application Priority Data

Mar. 17, 2016 (JP) ................................. 2016-054002

(51) Int. Cl.
*H02J 50/10* (2016.01)
*H02J 50/12* (2016.01)

(52) U.S. Cl.
CPC .................................... *H02J 50/12* (2016.02)

(58) Field of Classification Search
CPC .. H02J 50/10; H02J 50/80; H02J 50/50; H02J 17/00; H02J 5/005; B25J 19/0045

USPC .......................................... 307/104; 320/108
See application file for complete search history.

(56) References Cited

U.S. PATENT DOCUMENTS

| 2008/0197710 A1* | 8/2008 | Kreitz | .................. B25J 19/0029 307/104 |
| 2013/0293192 A1* | 11/2013 | Abe | ....................... B60L 11/123 320/108 |
| 2016/0049826 A1* | 2/2016 | Lee | ......................... H02J 7/025 320/108 |

FOREIGN PATENT DOCUMENTS

JP 2007-336717 12/2007

* cited by examiner

*Primary Examiner* — Daniel Kessie
(74) *Attorney, Agent, or Firm* — Renner, Otto, Boisselle & Sklar, LLP

(57) ABSTRACT

A wireless power transmission system includes a power transmission apparatus, a power reception apparatus, a load driving apparatus, and a power control apparatus. The power control apparatus includes a direct current power supply, a main control circuit, and a communicator. Each time an operation load to be achieved by the load driving apparatus changes, the main control circuit updates a load instruction value for the load driving apparatus and a control parameter for adjusting a voltage of first alternating current power, the control parameter being used by the power transmission apparatus to convert first direct current power into the first alternating current power. The power transmission apparatus includes an inverter circuit and a power transmission control circuit that determines the voltage of the first alternating current power on the basis of the control parameter updated by the power control apparatus and that controls the inverter circuit.

10 Claims, 27 Drawing Sheets

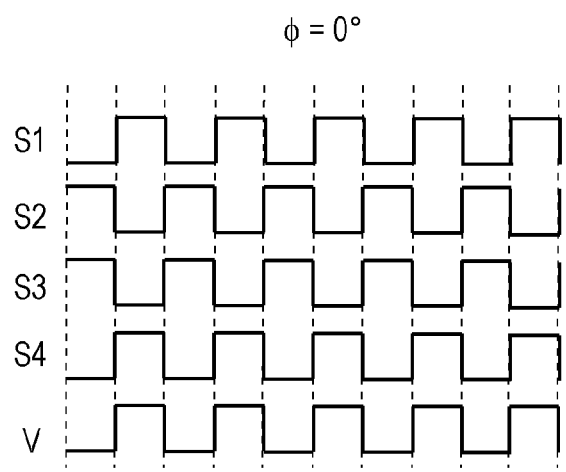
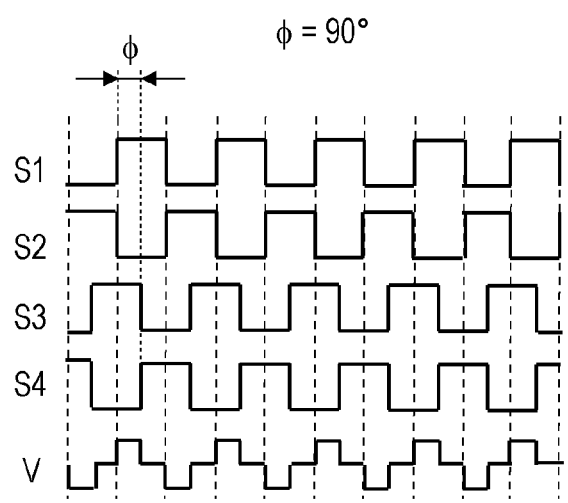

DUTY 50%

DUTY 25%

FIG. 16

| NUMBER | ROTATIONAL SPEED ω1 | |
|---|---|---|
| #0000 | 0 rpm | |
| #0100 | 100 rpm | LAST 1 MINUTE |
| #0200 | 200 rpm | LAST 2 MINUTES |
| ... | ... | ... |
| #0500 | 800 rpm | LAST 1 MINUTE |
| #0600 | 1,000 rpm | LAST 2 MINUTES |
| ... | ... | ... |

FIG. 17A

TABLE 1

| ROTATIONAL SPEED | CONTROL PARAMETER (θ) |
|---|---|
| 100 rpm | 170 DEGREES |
| 200 rpm | 150 DEGREES |
| ... | ... |
| 1,000 rpm | 50 DEGREES |

FIG. 17B

TABLE 2

| CHANGE IN ROTATIONAL SPEED (Δω) | LOAD CURRENT (i) |
|---|---|
| -100 rpm | 2.5 A |
| -200 rpm | 5 A |
| ... | ... |

FIG. 18

| ID | START TIME (min:s:ms) | END TIME (min:s:ms) | ROTATIONAL SPEED (rpm) | ROTATIONAL SPEED CHANGE (rpm) | CONTROL PARAMETER (θ) |
|---|---|---|---|---|---|
| 0 (INITIAL VALUE) | 0:00 | 0:00 | 0 | 0 | 0 |
| ... | ... | ... | ... | ... | ... |
| 100 | 1:00:00 | 3:00:00 | 500 | 0 | 160 |
| 105 | 3:00:00 | 3:00:10 | 1,000 | 500 | 50 |
| 200 | 3:00:10 | 4:00:00 | 1,000 | 0 | 155 |
| ... | ... | ... | ... | ... | ... |
| 505 | 8:00:00 | 8:00:10 | 500 | 250 | 100 |
| 600 | 8:00:10 | 11:00:00 | 500 | 0 | 160 |

FIG. 23

| ID | START TIME (min:s:ms) | END TIME (min:s:ms) | ROTATIONAL SPEED (rpm) | ROTATIONAL SPEED CHANGE (rpm) | CONTROL PARAMETER (θ) | TARGET VOLTAGE TO BE RECEIVED (V) |
|---|---|---|---|---|---|---|
| 0 (INITIAL VALUE) | 0:00 | 0:00 | 0 | 0 | 0 | 12 |
| ... | ... | ... | ... | ... | ... | ... |
| 100 | 1:00:00 | 3:00:00 | 500 | 0 | 160 | 12 |
| 105 | 3:00:00 | 3:00:10 | 1,000 | 500 | 30 | 12 |
| 200 | 3:00:10 | 4:00:00 | 1,000 | 0 | 155 | 12 |
| ... | ... | ... | ... | ... | ... | ... |
| 505 | 8:00:00 | 8:00:10 | 500 | 250 | 100 | 12 |
| 600 | 8:00:10 | 11:00:00 | 500 | 0 | 160 | 12 |

WIRELESS POWER TRANSMISSION SYSTEM

BACKGROUND

1. Technical Field

The present disclosure relates to a wireless power transmission system that wirelessly transmits power.

2. Description of the Related Art

During these years, wireless (noncontact) power transmission techniques for wirelessly transmitting power (in a noncontact manner) to mobile devices such as mobile phones and electric automobiles are being developed. In Japanese Unexamined Patent Application Publication No. 2007-336717, for example, a noncontact power transmission system capable of keeping constant rectified voltage of power transmitted in a noncontact manner is disclosed.

SUMMARY

In the technique disclosed in the example of the related art, when an operation state of a load is suddenly changed, it is difficult to follow a sudden change in load voltage and undesirably takes time to achieve a desired operation state.

In one general aspect, the techniques disclosed here feature a wireless power transmission system including a power transmission apparatus, a power reception apparatus, a load driving apparatus, and a power control apparatus that supplies power from a direct current power supply to the load driving apparatus through the power transmission apparatus and the power reception apparatus and outputs a load instruction value for the load driving apparatus to the load driving apparatus without using the power transmission apparatus and the power reception apparatus. The power control apparatus includes the direct current power supply, a main control circuit that updates the load instruction value for the load driving apparatus each time an operation load to be achieved by the load driving apparatus changes, and a communicator that outputs the updated load instruction value to the load driving apparatus. The power transmission apparatus includes a power transmission inverter circuit that converts first direct current power supplied from the direct current power supply into first alternating current power, and a power transmission antenna that wirelessly transmits the first alternating current power obtained as a result of the conversion. The power reception apparatus includes a power reception antenna that is electromagnetically coupled with the power transmission antenna and receives the transmitted first alternating current power, and a rectifier that converts the received first alternating current power into second direct current power. The load driving apparatus includes a load, a load inverter circuit that converts the second direct current power into second alternating current power, a load receiver that receives the load instruction value from the power control apparatus, and a load control circuit that determines a current of the second alternating current power on the basis of the load instruction value and drives the load. The main control circuit of the power control apparatus updates, if the operation load to be achieved by the load driving apparatus changes, a control parameter for adjusting a voltage of the first alternating current power, the control parameter being used by the power transmission apparatus to convert the first direct current power into the first alternating current power. The communicator of the power control apparatus outputs the updated control parameter to the power transmission apparatus and the updated load instruction value to the load driving apparatus. The power transmission apparatus further includes a power transmission control circuit that determines the voltage of the first alternating current power on the basis of the updated control parameter from the power control apparatus and that controls the power transmission inverter circuit.

According to the aspect of the present disclosure, a time taken to achieve a desired operation state when an operation state of the load is suddenly changed can be reduced.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10A is a diagram schematically illustrating temporal changes in four pulse signals and voltage output from the power transmission inverter circuit at a time when the amount of phase shift between two pulse signals supplied to two switching devices and the amount of phase shift between two pulse signals supplied to the other two switching devices are 0 degrees;

FIG. 10B is a diagram schematically illustrating temporal changes in the four pulse signals and the voltage output from the power transmission inverter circuit at a time when the amount of phase shift between the two pulse signals supplied to the two switching devices and the amount of phase shift between the two pulse signals supplied to the other two switching devices are 90 degrees;

FIG. 16 is a diagram illustrating an example of an operation procedure specified in a program;

FIG. 17A is a diagram illustrating an example of a table in which a relationship between rotational speed and the control parameter is specified;

FIG. 17B is a diagram illustrating an example of a table in which a relationship between changes in the rotational speed and load current is specified;

FIG. 18 is a diagram illustrating a more specific example of the table;

FIG. 23 is a diagram illustrating a modification of the table;

DETAILED DESCRIPTION

Underlying Knowledge Forming Basis of the Present Disclosure

Before describing embodiments of the present disclosure, underlying knowledge forming a basis of the present disclosure will be described.

Figure 1:
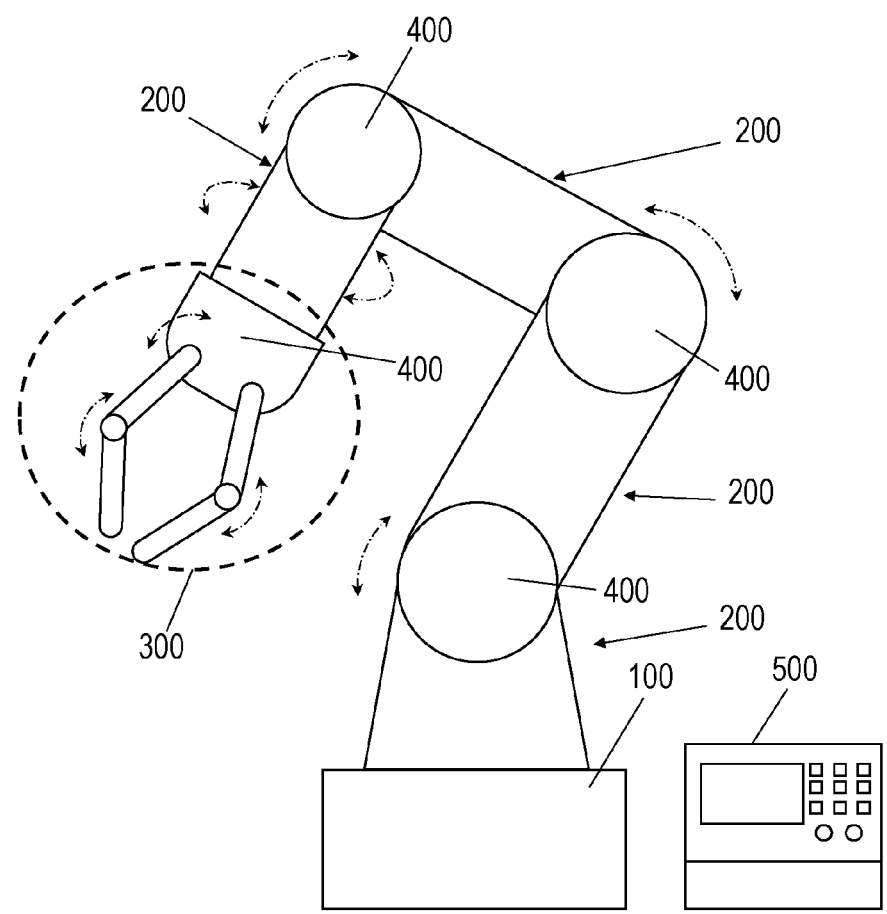
FIG. 1 is a diagram illustrating an example in which a wireless power transmission system is applied to a robot arm.

FIG. 1 is a diagram schematically illustrating an example of a wireless power transmission system examined by the present inventors. FIG. 1 illustrates an example in which a wireless power transmission system is applied to a robot arm used in a factory or the like. The wireless power transmission system includes a power transmission apparatus 100, a power reception apparatus 300, a plurality of relay apparatuses 200, a plurality of load driving apparatuses 400, and a power control apparatus 500 (power controller) that control transmission of power and driving of loads. The power reception apparatus 300 in this example is a hand connected to an end of the robot arm.

The plurality of relay apparatuses 200 are provided between the power transmission apparatus 100 and the power reception apparatus 300. A load driving apparatus 400 is connected to each of the plurality of relay apparatuses 200 and the power reception apparatus 300. Each load driving apparatus 400 includes a load such as a motor and an inverter circuit that drives the load. Each load driving apparatus 400 is provided at a movable portion (e.g., a joint) of the robot arm, and the movable portion can be moved by driving the motor.

Figure 2A:
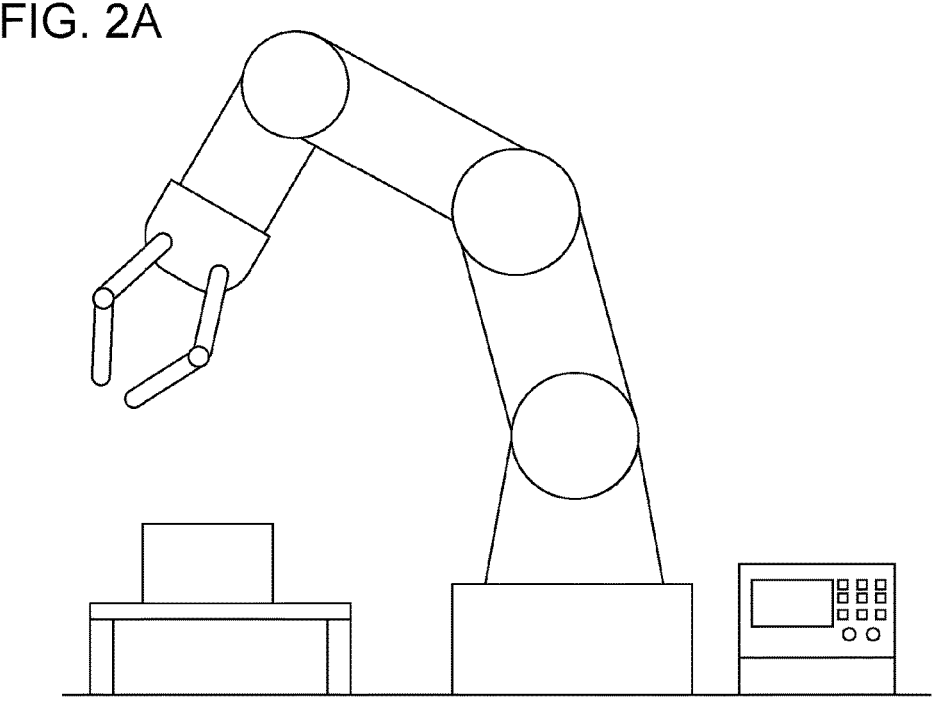
FIG. 2A is a diagram illustrating an example of the robot arm whose attitude has been changed from a state illustrated in FIG. 1.
Figure 2B:
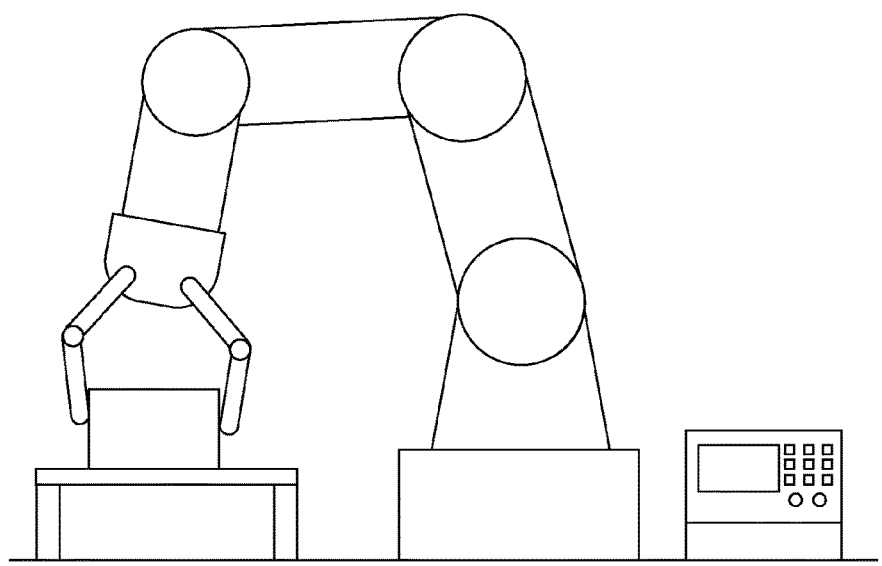
FIG. 2B is a diagram illustrating a situation in which a hand at an end of the robot arm is grasping an article after the attitude of the robot arm is further changed from a state illustrated in FIG. 2A.

FIG. 2A illustrates an example of the robot arm whose attitude has been changed from a state illustrated in FIG. 1. FIG. 2B illustrates a situation in which the hand at the end of the robot arm is grasping an article after the attitude of the robot arm is further changed from a state illustrated in FIG. 2A. As illustrated in FIGS. 2A and 2B, the robot arm can move joints thereof using the plurality of load driving apparatuses 400 and, for example, convey articles.

Wireless power transmission through power transmission antennas and power reception antennas is performed between the power transmission apparatus 100, the plurality of relay apparatuses 200, and the power reception apparatus 300. The power transmission apparatus 100 includes a power transmission antenna including a power transmission coil. The power reception apparatus 300 includes a power reception antenna including a power reception coil. Each relay apparatus 200 includes both a power reception antenna and a power transmission antenna. The power transmission apparatus 100 wirelessly transmits power sequentially to the plurality of relay apparatuses 200 and the power reception apparatus 300 connected in series with one another. Each of the plurality of relay apparatuses 200 and the power reception apparatus 300 supplies the wirelessly transmitted power to the load driving apparatus 400 connected thereto. The load such as a motor in each load driving apparatus 400 is thus driven.

By applying a wireless power transmission system to a robot arm as in this example, cables for transmitting power can be eliminated from between a power transmission apparatus 100, a plurality of relay apparatuses 200, and a power reception apparatus 300. In a conventional robot arm in which cables are used, an accident might occur when a component of the robot arm gets caught on one of the cables, and movable ranges of the robot arm and a hand are undesirably limited by the cables. Furthermore, the cables might hinder replacement of components, thereby decreasing work efficiency. By applying wireless power transmission as in the example illustrated in FIG. 1, an accident due to the cables can be prevented, the movable ranges of the robot arm and the hand can be increased, and the work efficiency during replacement of components improves.

Figure 3:
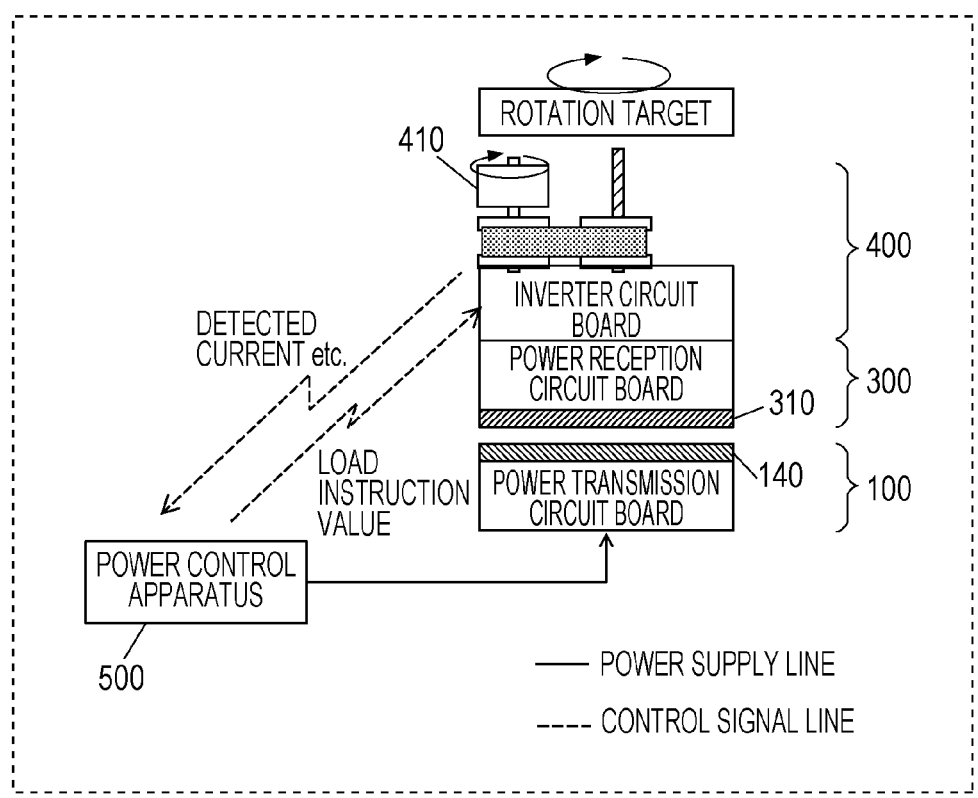
FIG. 3 is a diagram illustrating an example of a schematic configuration of a wireless power transmission system in a comparison example.

FIG. 3 is a diagram illustrating an example of a schematic configuration of a wireless power transmission system in a comparison example of the embodiments of the present disclosure. An example of a wireless power transmission system that does not include a relay apparatus 200 will be described here for the sake of simplicity.

A power transmission apparatus 100 includes a power transmission antenna 140 including a power transmission coil and a power transmission circuit board. The power transmission circuit board includes an inverter circuit that converts direct current (DC) power supplied from a DC power supply included in a power control apparatus 500 into alternating current (AC) power and that supplies the AC power to the power transmission antenna 140.

A power reception apparatus 300 includes a power reception antenna 310 including a power reception coil and a power reception circuit board. The power reception antenna 310 is electromagnetically coupled with the power transmission antenna 140 and receives power in a noncontact manner. The power reception circuit board includes a rectifier circuit (rectifier) that rectifies the AC power received by the power reception antenna 310 to DC power and that supplies the DC power to a load driving apparatus 400.

The load driving apparatus 400 includes a load 410 such as a motor and an inverter circuit board that controls the operation of the load 410. The inverter circuit board includes an inverter circuit that drives the load 410 and a control circuit.

With the power transmission antenna 140 and the power reception antenna 310 facing each other, the power transmission antenna 140 transmits power to the power reception antenna 310 in a noncontact manner. The load driving apparatus 400 receives power from the power reception apparatus 300 and drives the load 410 such as a motor. As a result, a rotation target (e.g., a joint) can be rotated.

The power control apparatus 500 supplies DC power to the power transmission apparatus 100 and controls the operation of the load 410 of the load driving apparatus 400. The power control apparatus 500 issues an instruction to start an operation to the load 410, for example, in accordance with an instruction from a user or a predetermined program and an instruction to change an operation state (e.g., the rotational speed of the motor or the like). Although only one load 410 is illustrated in FIG. 3, if there are a plurality of loads, the power control apparatus 500 controls an operation state of each of the plurality of loads.

When changing the operation state of the load 410, the power control apparatus 500 determines a load instruction value (e.g., the rotational speed of the motor) for driving the load 410 and transmits a signal indicating the determined load instruction value to the load driving apparatus 400. Each time the power control apparatus 500 updates the load instruction value in accordance with an instruction from the user or the predetermined program, the power control apparatus 500 transmits the updated load instruction value to the load driving apparatus 400. The load instruction value is an arbitrary parameter for determining the operation state of the load 410, such as the rotation speed of the motor, a position, a frequency, a voltage, or a current.

Upon receiving the updated load instruction value from the power control apparatus 500, the load driving apparatus 400 changes the operation state of the load 410 on the basis of the value. If the load 410 is a motor driven by three-phase AC power, for example, the load driving apparatus 400 achieves a desired operation state by changing a timing at which a control signal (pulse signal) is supplied to a three-phase inverter circuit that drives the motor. After changing the operation state, the load driving apparatus 400 detects current flowing into the load 410, for example, and then includes information regarding the current in a response signal and transmits the response signal to the power control apparatus 500.

Figure 4:
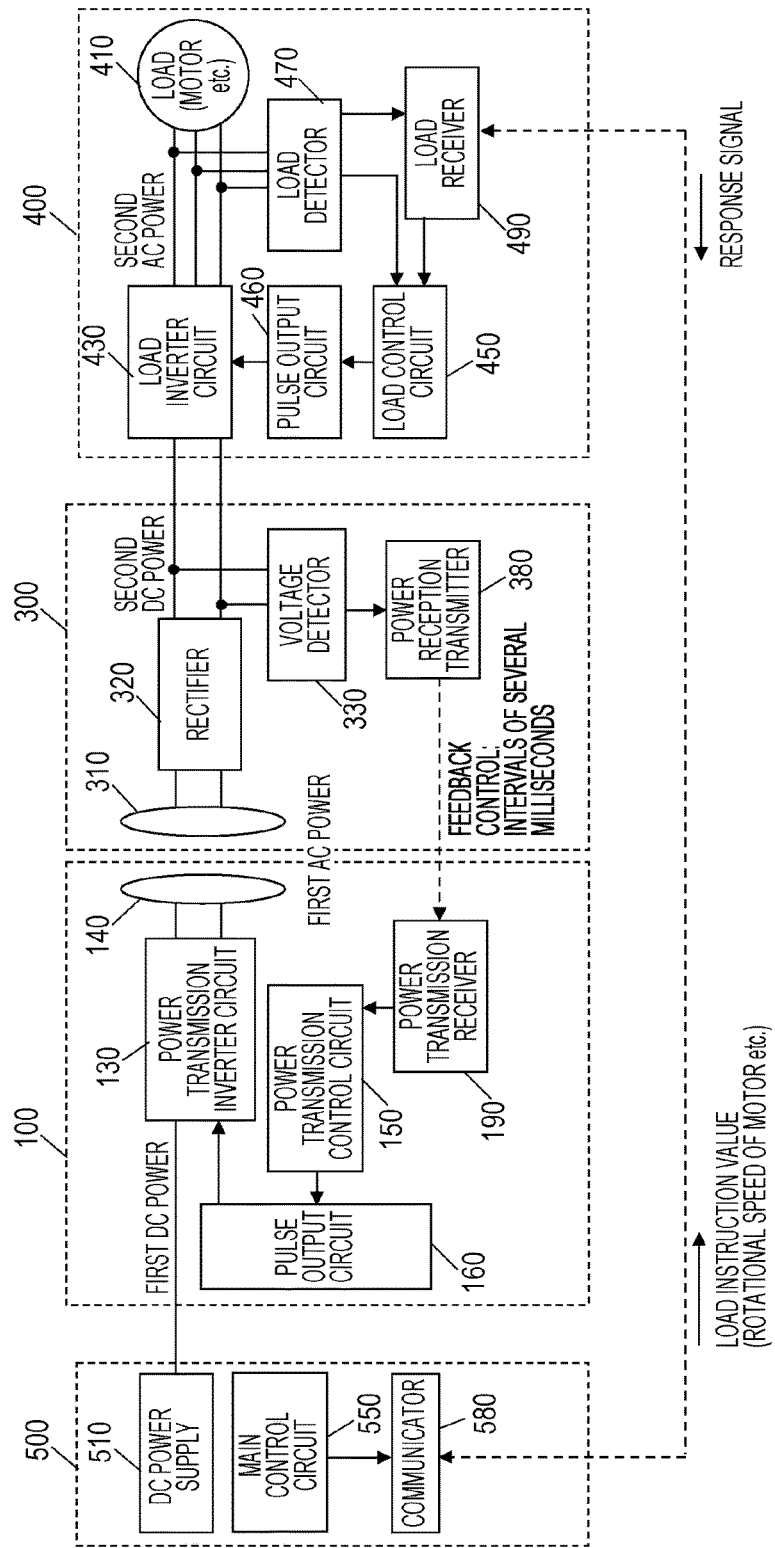
FIG. 4 is a block diagram illustrating a more detailed configuration of the wireless power transmission system in the comparison example.

FIG. 4 is a block diagram illustrating a more detailed configuration of the wireless power transmission system in the comparison example. The power transmission apparatus 100 includes the power transmission antenna 140, a power transmission inverter circuit 130, a pulse output circuit 160, a power transmission control circuit 150, and a power transmission receiver 190. The power transmission inverter circuit 130 receives first DC power output from a DC power supply 510 of the power control apparatus 500, converts the first DC power into first AC power, and supplies the first AC power to the power transmission antenna 140. The pulse output circuit 160 outputs pulse signals to be supplied to a plurality of switching devices of the power transmission inverter circuit 130. The power transmission control circuit 150 controls the amplitude of the voltage of the first AC power output from the power transmission inverter circuit 130, for example, by controlling timings at which the pulse signals are output from the pulse output circuit 160.

The power reception apparatus 300 includes the power reception antenna 310, a rectifier 320 connected to the power reception antenna 310, a voltage detector 330, and a power reception transmitter 380. The rectifier 320 converts the first AC power received by the power reception antenna 310 into second DC power and outputs the second DC power to the load driving apparatus 400. The voltage detector 330 detects a voltage of the second DC power output from the rectifier 320. The power reception transmitter 380 transmits a signal indicating the voltage detected by the voltage detector 330 to the power transmission receiver 190. The signal is used in feedback control for keeping constant the voltage (hereinafter also referred to as "load voltage") of the second DC power supplied to the load driving apparatus 400. The detection and transmission of the load voltage is regularly performed, for example, at intervals of several milliseconds.

The power transmission control circuit 150 obtains information regarding the load voltage through the power transmission receiver 190 and then controls the power transmission inverter circuit 130 in such a way as to suppress variation in the load voltage. More specifically, if detecting a change in the load voltage, the power transmission control circuit 150 changes a control parameter such as frequencies or duty ratios of the pulse signals supplied to the switching devices of the power transmission inverter circuit 130 to suppress variation in the voltage of the first AC power output from the power transmission inverter circuit 130. By performing this operation a plurality of times at intervals of several milliseconds, for example, a substantially constant voltage is supplied to the load driving apparatus 400.

The power control apparatus 500 includes the DC power supply 510, a main control circuit 550, and a communicator 580. Each time an operation load to be achieved by the load driving apparatus 400 changes, the main control circuit 550 updates the load instruction value for the load driving apparatus 400. The communicator 580 transmits a signal indicating the updated load instruction value to the load driving apparatus 400.

The load driving apparatus 400 includes a load inverter circuit 430, a pulse output circuit 460, a load control circuit 450, a load detector 470, and a load receiver 490. The load inverter circuit 430 converts the second DC power output from the rectifier 320 into second AC power and supplies the second AC power to the load 410. The pulse output circuit 460 outputs pulse signals supplied to a plurality of switching devices of the load inverter circuit 430. The load control circuit 450 controls the load inverter circuit 430 by adjusting the pulse signals output from the pulse output circuit 460. The load detector 470 detects the rotational speed of the motor included in the load 410, the current flowing into the load 410, or the like. The load receiver 490 receives the load instruction value from the communicator 580 of the power control apparatus 500 and transmits a response signal.

The load control circuit 450 adjusts timings at which the pulse signals are output from the pulse output circuit 460 on the basis of the load instruction value transmitted from the power control apparatus 500 and the current load instruction value detected by the load detector 470. As a result, a desired operation state based on the load instruction value is achieved.

The present inventors have found that, with the configuration in the comparison example, it takes time to achieve a desired operation state when the operation state of the load 410 (e.g., the rotational speed of the motor) is suddenly changed. This problem will be described hereinafter.

Figure 5:
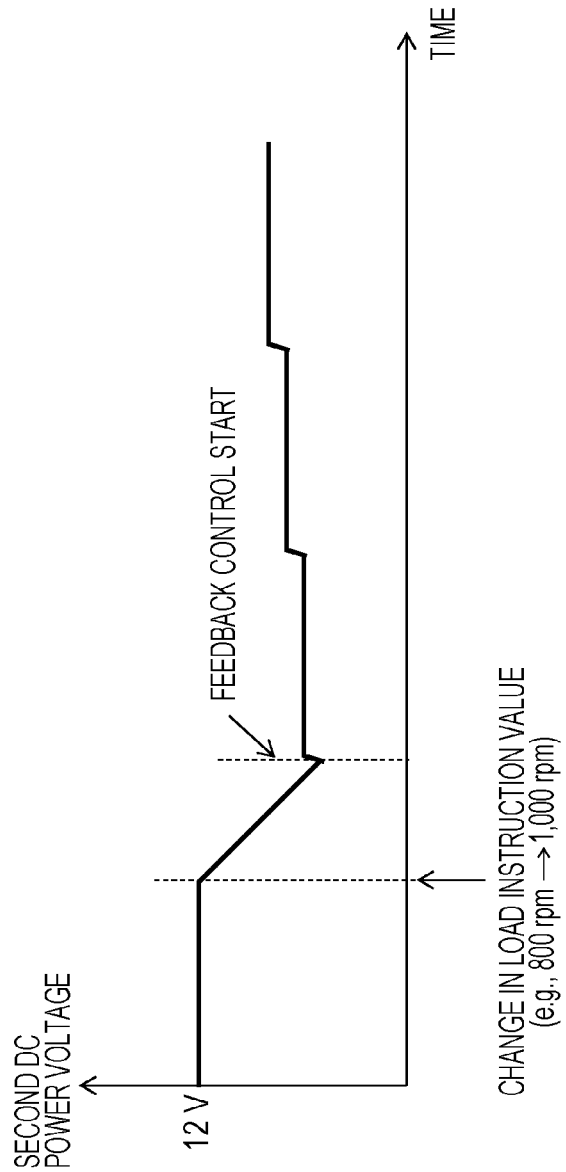
FIG. 5 is a diagram illustrating a problem of the comparison example.

FIG. 5 is a diagram illustrating an example of temporal changes in the voltage (load voltage) of the second DC power at a time when the load instruction value is changed. An example of a case in which the rotational speed of the motor, which is the load instruction value, is changed from 800 rpm to 1,000 rpm will be described here. It is assumed that before the load instruction value is changed, the load voltage is 12 V, and the voltage of 12 V needs to be maintained even after the change. In order to increase the rotational speed, the torque of the motor needs to be increased. For this purpose, current flowing into a load needs to be increased. If the current flowing into the load suddenly increases, the load voltage suddenly decreases. In the feedback control in an example of the related art, however, it is difficult to follow this sudden change in the voltage. As described above, the feedback control is performed at intervals of, say, several milliseconds. On the other hand, the load voltage suddenly changes in a shorter period of time. Furthermore, in the feedback control, the voltage is not corrected to a desired value at once, but the desired voltage is achieved only after a multiple of operations for slightly correcting the voltage. It, therefore, takes time to achieve a desired operation state indicated by the updated load instruction value.

The present inventors have thus found that it is difficult to follow a sudden change in the operation state of the load just by applying the feedback control in the example of the related art. The present inventors have found that, by introducing a novel type of control in addition to the feedback control, the problem can be solved. More specifically, the present inventors have found that the problem can be solved by, when the load instruction value is changed, adjusting the control parameter of the power transmission inverter circuit 130 to an appropriate value according to the updated load instruction value.

As a result of the above examination, the present inventors have conceived an aspect disclosed below.

A wireless power transmission system including:
a power transmission apparatus;
a power reception apparatus;
a load driving apparatus; and
a power control apparatus that supplies power from a direct current power supply to the load driving apparatus through the power transmission apparatus and the power reception apparatus and outputs a load instruction value for the load driving apparatus to the load driving apparatus without using the power transmission apparatus and the power reception apparatus, in which the power control apparatus includes
the direct current power supply,
a main control circuit that updates the load instruction value for the load driving apparatus each time an operation load to be achieved by the load driving apparatus changes, and
a communicator that outputs the updated load instruction value to the load driving apparatus, in which the power transmission apparatus includes
a power transmission inverter circuit that converts first direct current power supplied from the direct current power supply into first alternating current power, and
a power transmission antenna that wirelessly transmits the first alternating current power obtained as a result of the conversion, in which the power reception apparatus includes
a power reception antenna that is electromagnetically coupled with the power transmission antenna and receives the transmitted first alternating current power, and
a rectifier that converts the received first alternating current power into second direct current power, in which the load driving apparatus includes
a load,
a load inverter circuit that converts the second direct current power into second alternating current power,
a load receiver that receives the load instruction value from the power control apparatus, and
a load control circuit that determines a current of the second alternating current power on the basis of the load instruction value and drives the load, in which the main control circuit of the power control apparatus updates, if the operation load to be achieved by the load driving apparatus changes, a control parameter for adjusting a voltage of the first alternating current power, the control parameter being used by the power transmission apparatus to convert the first direct current power into the first alternating current power, in which the communicator of the power control apparatus outputs the updated control parameter to the power transmission apparatus and the updated load instruction value to the load driving apparatus, and in which the power transmission apparatus further includes a power transmission control circuit that determines the voltage of the first alternating current power on the basis of the updated control parameter from the power control apparatus and that controls the power transmission inverter circuit.

According to the above aspect,
the main control circuit of the power control apparatus updates, if the operation load to be achieved by the load driving apparatus changes, the control parameter for adjusting the voltage of the first alternating current power, the control parameter being used by the power transmission apparatus to convert the first direct current power into the first alternating current power, the communicator of the power control apparatus outputs the updated control parameter to the power transmission apparatus and the updated load instruction value to the load driving apparatus, and the power transmission apparatus includes the power transmission control circuit that determines the voltage of the first alternating current power on the basis of the updated control parameter from the power control apparatus and that controls the power transmission inverter circuit.

As a result, if the operation load to be achieved by the load driving apparatus changes, the power transmission control circuit can control the power transmission inverter circuit using the updated control parameter obtained from the main control circuit. Because the updated control parameter is a value according to the updated load instruction value, a change in the voltage of the second direct current power can be suppressed even if the operation load suddenly changes.

A "control parameter" herein refers to a parameter for determining a level of voltage output from a power transmission inverter circuit. The control parameter, for example, can be frequencies of pulse signals supplied to a plurality of switching devices included in the power transmission inverter circuit, a phase difference (also referred to as the "amount of phase shift" or the "amount of phase deviation") between two pulse signals supplied to two switching devices simultaneously turned on, or duty ratios of the pulse signals supplied to the plurality of switching devices. By changing the control parameter, a level of AC voltage output from the power transmission inverter circuit can be changed, thereby changing the amplitude of alternating power received by a power reception apparatus. A signal or information indicating the control parameter will be simply referred to as a "control parameter" herein.

A "load instruction value" herein refers to a parameter for determining an operation state of a load (e.g., a motor) included in a load driving apparatus. The load instruction value, for example, can be a rotational speed of the motor, a current or a voltage supplied to the load, a control parameter of an inverter circuit connected to the load, or the like. A signal or information indicating the load instruction value will be simply referred to as a "load instruction value" herein.

The specific embodiments of the present disclosure will be described hereinafter. Unnecessarily detailed description, however, might be omitted. Detailed description of already well-known items and redundant description of substantially the same components, for example, might be omitted in order to keep the following description from becoming unnecessarily redundant and enable those skilled in the art to understand the present disclosure easily. It is to be noted that the present inventors provide the following description and the accompanying drawings for those skilled in the art to fully understand the present disclosure and do not intend to limit the scope of the claims. In the following description, the same or similar components are given the same reference numerals.

In the following description, terms relating to a power transmission apparatus will be indicated by a prefix "power transmission", terms relating to a power reception apparatus will be indicated by a prefix "power reception" for clarification purposes. Terms relating to a relay apparatus will be indicated by a prefix "relay", and terms relating to a load driving apparatus 400 will be indicated by a prefix "load". The prefixes "power transmission", "power reception", "relay", and "load" might be omitted for the sake of simplification.

First Embodiment

Figure 6:
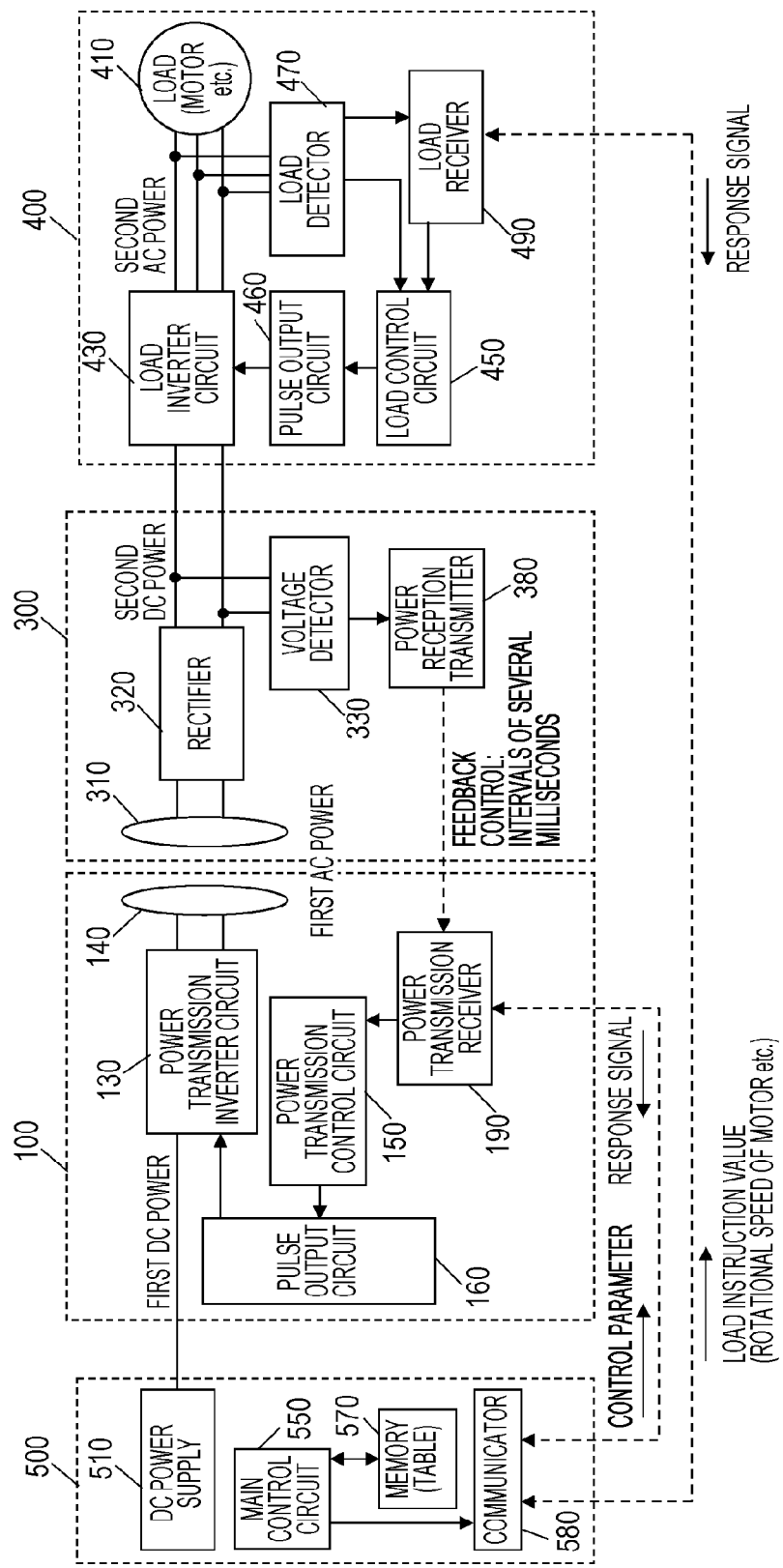
FIG. 6 is a block diagram illustrating the configuration of a wireless power transmission system according to a first embodiment of the present disclosure.

FIG. 6 is a block diagram illustrating the configuration of a wireless power transmission system according to a first embodiment of the present disclosure. A physical configuration of the wireless power transmission system according to the present embodiment is the same as that in a comparison example illustrated in FIG. 4, but the operation of a main control circuit 550 in a power control apparatus 500 is different. In the present embodiment, when transmitting a load instruction value to the load driving apparatus 400, the main control circuit 550 sets a control parameter of a power transmission inverter circuit 130 to an appropriate value according to the load instruction value and transmits the control parameter to a power transmission apparatus 100. The power transmission apparatus 100 drives the power transmission inverter circuit 130 using the control parameter according to the load instruction value. As a result, a desired operation state can be achieved in a short period of time. The configuration and the operation according to the present embodiment, especially differences from the comparison example, will be described hereinafter.

The wireless power transmission system according to the present embodiment includes the power transmission apparatus 100, a power reception apparatus 300, the load driving apparatus 400, and the power control apparatus 500. The power control apparatus 500 includes a DC power supply 510, the main control circuit 550 that updates the load instruction value for the load driving apparatus 400 each time an operation load to be achieved by the load driving apparatus 400 changes, and a communicator (communication circuit) 580 that outputs the updated load instruction value to the load driving apparatus 400. The power control apparatus 500 supplies the power output from the DC power supply 510 to the load driving apparatus 400 through the power transmission apparatus 100 and the power reception apparatus 300. On the other hand, the power control apparatus 500 outputs the load instruction value for the load driving apparatus 400 to the load driving apparatus 400 without using the power transmission apparatus 100 and the power reception apparatus 300.

The power transmission apparatus 100 includes the power transmission inverter circuit 130 that converts first DC power supplied from the DC power supply 510 into first AC power and that outputs the first AC power, a power transmission antenna 140 that wirelessly transmits the first AC power obtained as a result of the conversion, a power transmission control circuit 150 and a pulse output circuit 160 that control the power transmission inverter circuit 130, and a power transmission receiver 190. The power transmission antenna 140, for example, is a resonant circuit including a power transmission coil and a capacitor.

The power reception apparatus 300 includes a power reception antenna 310 that is electromagnetically coupled with the power transmission antenna 140 and that receives the transmitted first AC power and a rectifier (rectifier circuit) 320 that converts the received first AC power into second DC power. The power reception antenna 310, for example, is a resonant circuit including a power reception coil and a capacitor. The power reception apparatus 300 further includes a voltage detector 330 that detects the voltage of the second DC power and a power reception transmitter 380 that outputs the detected voltage of the second DC power to the power transmission apparatus 100. Information regarding the voltage is used by the power transmission control circuit 150 for feedback control.

The load driving apparatus 400 includes a load 410 (e.g., a motor, a light, a camera, or the like), a load inverter circuit 430 that converts the second DC power into second AC power, a load receiver 490 that receives the load instruction value from the power control apparatus 500, and a load control circuit 450 that determines a current of the second AC power on the basis of the load instruction value and that drives the load 410. The second AC power output from the load inverter circuit 430 may be single-phase AC power or three-phase AC power. If the load 410 is a motor driven with three-phase AC power, such as a permanent magnet synchronous motor or an induction motor, an inverter circuit that outputs three-phase AC power is used as the load inverter circuit 430.

The power reception apparatus 300 according to the present embodiment is a hand connected to an end of a robot arm, but may be another apparatus. The power reception apparatus 300, for example, may be a rotating unit of a monitoring camera or the like, instead. The load 410 according to the present embodiment is a device that includes a motor such as an actuator and that is mounted on the hand at the end of the robot arm. The load 410, for example, may be a camera including an image sensor such as a charge-coupled device (CCD), a lighting apparatus, or the like mounted on the rotating unit of the monitoring camera, instead.

Figure 7:
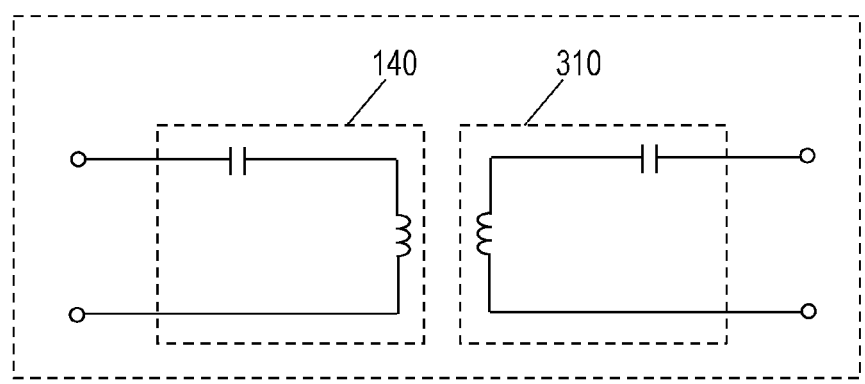
FIG. 7 is a diagram illustrating an example of an equivalent circuit of a power transmission antenna and a power reception antenna.

The power transmission antenna 140 and the power reception antenna 310 can each be achieved by a resonant circuit including a coil and a capacitor. FIG. 7 illustrates an example of an equivalent circuit of the power transmission antenna 140 and the power reception antenna 310, each having a configuration of a series resonant circuit. Alternatively, the power transmission antenna 140 and the power reception antenna 310 may each have a configuration of a parallel resonant circuit. The coil of the power transmission antenna 140 will be referred to as a "power transmission coil", and the coil of the power reception antenna 310 will be referred to as a "power reception coil" herein. Power is wirelessly transmitted through inductive coupling (that is, magnetic coupling) between the power transmission coil and the power reception coil. The power transmission antenna 140 and the power reception antenna 310 may have a configuration in which power is wirelessly transmitted through electrical coupling, instead of magnetic coupling. In this case, the power transmission antenna 140 and the power reception antenna 310 can each include two electrodes for transmitting or receiving power and a resonant circuit including an inductor and a capacitor. A power transmission antenna and a power reception antenna that use electrical coupling can be preferably used, for example, when power is wirelessly transmitted to a moving apparatus, such as a carrier robot in a factory.

The main control circuit 550, the power transmission control circuit 150, and the load control circuit 450, for example, can each be an integrated circuit including a processor and a memory, such as a microcontroller. Control programs (software) and various tables for achieving operations described later can be stored in the memory. Functions described later are achieved when the processor executes the control programs. The main control circuit 550, the power transmission control circuit 150, and the load control circuit 450 need not be achieved by software, but may be achieved by hardware alone, instead.

A communication technique employed between the power transmission receiver 190 and the power reception transmitter 380, between the communicator 580 and the power transmission receiver 190, and between the communicator 580 and the load receiver 490 is not limited to a particular technique. Any wireless communication technique such as amplitude modulation, frequency modulation, a wireless local area network (LAN), or ZigBee (registered trademark) may be used.

When the operation load to be achieved by the load driving apparatus 400 changes, the main control circuit 550 of the power control apparatus 500 updates the control parameter for adjusting the voltage of the first AC power used by the power transmission apparatus 100 to convert the first DC power into the first AC power. The power control apparatus 500 includes, for this purpose, a memory 570 storing a table specifying relationships between the load instruction value and the control parameter. The communicator 580 of the power control apparatus 500 outputs the updated control parameter to the power transmission apparatus 100 and the updated load instruction value to the load driving apparatus 400.

The power transmission control circuit 150 of the power transmission apparatus 100 determines the voltage of the first AC power on the basis of the updated control parameter transmitted from the power control apparatus 500 and controls the inverter circuit 130 using the control parameter. The power transmission control circuit 150 controls the inverter circuit 130 by outputting a control signal to the pulse output circuit 160 (e.g., a gate driver). The power transmission control circuit 150 uses the power transmission inverter circuit 130 to perform control (feedback control) for eliminating a difference between (i) a voltage of the second DC power corresponding to the first AC power based on a previous control parameter and (ii) and a voltage of the second DC power corresponding to the first AC power based on the current control parameter.

As described above, the control parameter is a parameter for determining the level of voltage output from the inverter circuit 130. The control parameter, for example, can be frequencies of pulse signals supplied to a plurality of switching devices included in the inverter circuit 130, the amount of phase shift between two pulse signals supplied to two switching devices simultaneously turned on, or duty ratios of pulse-width modulation (PWM) pulse signals supplied to the plurality of switching devices. Although not illustrated in FIG. 6, a DC-to-DC converter may be provided in a previous stage of the inverter circuit 130, and the power transmission control circuit 150 may change the voltage of the first DC power input to the inverter circuit 130. In this case, an output voltage of the DC-to-DC converter may be used as the control parameter. The power transmission control circuit 150 can adjust the voltage output from the DC-to-DC converter by changing the switching frequency of a switching device in the DC-to-DC converter. By changing the control parameter in the above-described manner, a level of the voltage of the AC power output from the inverter circuit 130 can be changed, thereby changing the amplitude of the AC power received by the power reception apparatus 300.

Figure 8A:
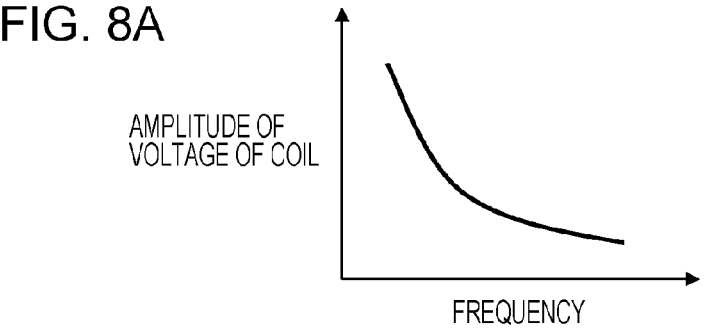
FIG. 8A is a diagram schematically illustrating an example of the dependence of the amplitude of voltages at both ends of a coil of the power transmission antenna upon frequency.
Figure 8B:
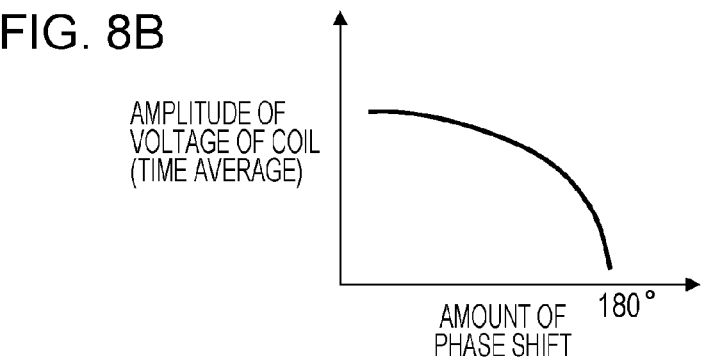
FIG. 8B is a diagram schematically illustrating an example of the dependence of the amplitude (time average) of the voltages at both ends of the coil of the power transmission antenna upon the amount of phase shift.
Figure 8C:
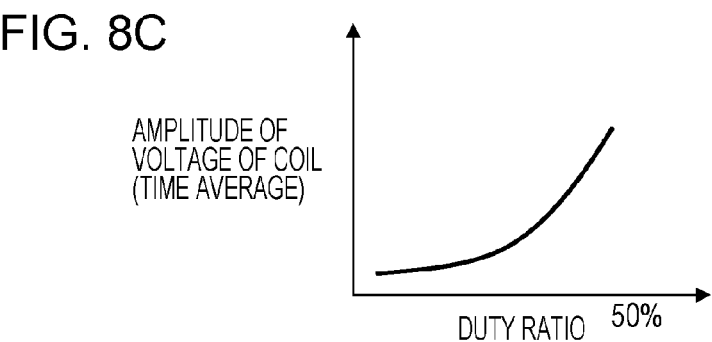
FIG. 8C is a diagram schematically illustrating an example of the dependence of the amplitude (time average) of the voltages at both ends of the coil of the power transmission antenna upon a duty ratio.
Figure 8D:
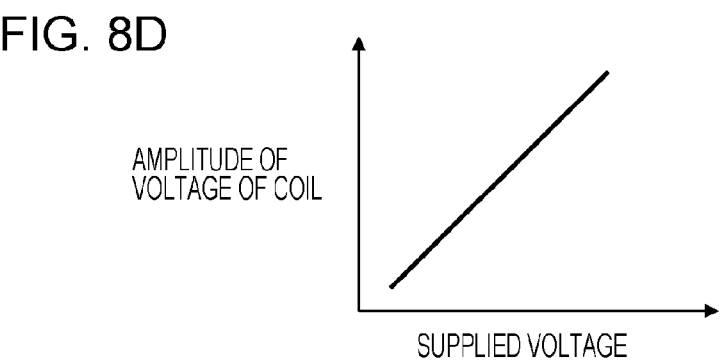
FIG. 8D is a diagram schematically illustrating an example of the dependence of the amplitude of the voltages at both ends of the coil of the power transmission antenna upon voltage supplied to a power transmission inverter circuit.

FIGS. 8A to 8D schematically illustrate an example of the dependence of the amplitude of voltages at both ends of the coil of the power transmission antenna 140 upon the frequency, the amount of phase shift, the duty ratio, and the voltage supplied to the inverter circuit 130, respectively. As illustrated in FIG. 8A, the amplitude of the voltages at both ends of the coil decreases as the frequency increases. In low frequency bands, however, the amplitude of the voltages decreases as the frequency decreases. As illustrated in FIG. 8B, a time average of the amplitude of the voltages at both ends of the coil decreases as the amount of phase shift increases from 0° to 180°. As illustrated in FIG. 8C, the time average of the amplitude of the voltages at both ends of the coil increases as the duty ratio increases within a range of 0% to 50%. As illustrated in FIG. 8D, the amplitude of the voltages at both ends of the coil increases as the voltage supplied to the power transmission inverter circuit 130 increases. The power transmission control circuit 150, therefore, can control the amplitude of the voltages at both ends of the coil of the power transmission antenna 140 or the time average of the amplitude using at least any of the frequency, the amount of phase shift, the duty ratio, and the voltage supplied to the inverter circuit 130 as the control parameter.

Figure 9:
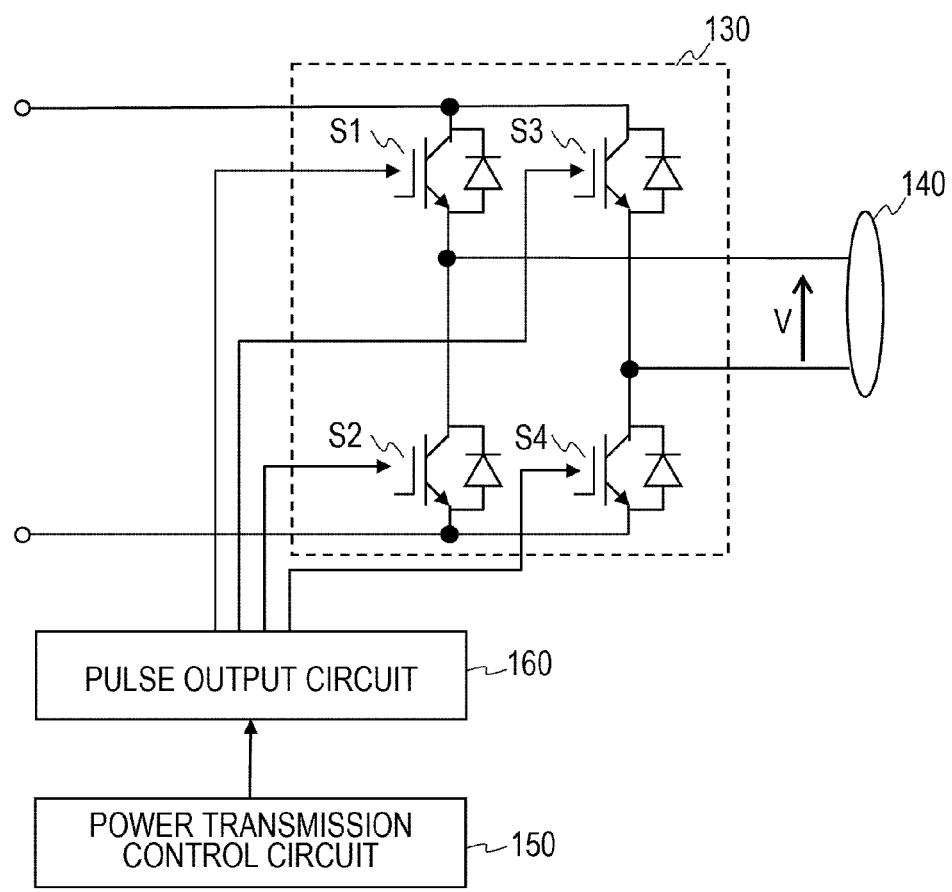
FIG. 9 is a diagram illustrating an example of the configuration of the power transmission inverter circuit.

FIG. 9 is a diagram illustrating an example of the configuration of the inverter circuit 130. The inverter circuit 130 includes a plurality of switching devices S1 to S4 that open or close in accordance with pulse signals supplied from the pulse output circuit 160. By opening or closing the plurality of switching devices S1 to S4, input DC power can be converted into AC power. In the example illustrated in FIG. 9, a full-bridge inverter circuit including the four switching devices S1 to S4 is used. In this example, each switching device is an insulated-gate bipolar transistor (IGBT), but may be a switching device of another type, such as a metal-oxide-semiconductor field-effect transistor (MOSFET), instead.

In the example illustrated in FIG. 9, among the four switching devices S1 to S4, the switching devices S1 and S4 (first switching device pair) output a voltage having the same polarity as that of the supplied DC voltage. On the other hand, the switching devices S2 and S3 (second switching device pair) output a voltage having a polarity opposite to that of the supplied DC voltage. The pulse output circuit 160 supplies pulse signals to gates of the four switching devices S1 to S4 in accordance with an instruction from the power transmission control circuit 150. At this time, amplitude control can be performed by adjusting a phase difference between two pulse signals supplied to the first switching device pair (S1 and S4) and a phase difference between two pulse signals supplied to the second switching device pair (S2 and S3).

FIGS. 10A and 10B are diagrams illustrating the amplitude control based on the phase differences between the pulse signals. FIG. 10A schematically illustrates temporal changes in the four pulse signals and a voltage V output from the inverter circuit 130 at a time when an amount φ of phase shift between the two pulse signals supplied to the switching devices S1 and S4 and an amount φ of phase shift between the two pulse signals supplied to the switching devices S2 and S3 are 0 degrees. FIG. 10B schematically illustrates temporal changes in the pulse signals and the voltage V at a time when the amount φ of phase shift is 90 degrees. The amount φ of phase shift is adjusted by temporally shifting rise and fall times of the pulse signals input to the switching devices S3 and S4 relative to rise and fall times of the pulse signals input to the switching devices S1 and S2. When the amount φ of phase shift is changed, an output time ratio of the voltage V (that is, a ratio of a period for which the voltage V is not zero to one period) changes. The closer the amount φ of phase shift to 0 degrees, the higher the output time ratio of the voltage V. The closer the amount φ of phase shift to 180 degrees, the lower the output time ratio of the voltage V. The voltage V output from the inverter circuit 130 can be converted into sine wave voltage using a smoothing circuit, which is not illustrated, and supplied to the power transmission antenna 140. The amplitude of the sine wave voltage changes in accordance with the output time ratio. A time average of the amplitude of the AC voltage input to the power transmission antenna 140, therefore, can be changed by changing the amount φ of phase shift.

Figure 11:
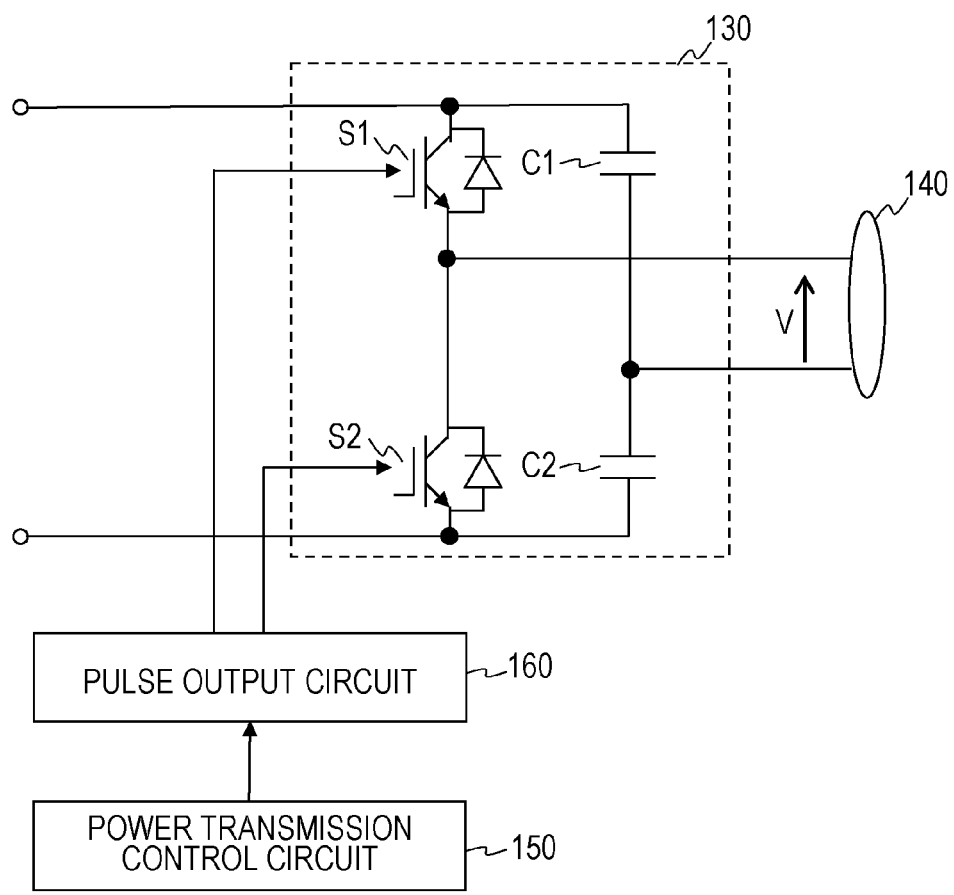
FIG. 11 is a diagram illustrating another example of the configuration of the power transmission inverter circuit.

FIG. 11 is a diagram illustrating another example of the configuration of the inverter circuit 130. The inverter circuit 130 in this example is a half-bridge inverter circuit. When the half-bridge inverter circuit is used, the above-described phase control cannot be applied. In this case, the time average of the amplitude of the voltage can be controlled by controlling duty ratios of pulse signals input to switching devices.

The inverter circuit 130 illustrated in FIG. 11 is a half-bridge inverter circuit including two switching devices S1 and S2 and two capacitors C1 and C2. The two switching devices S1 and S2 and the two capacitors C1 and C2 are connected in parallel with each other. An end of the power transmission antenna 140 is connected to a point between the two switching devices S1 and S2, and another end is connected to a point between the two capacitors C1 and C2.

The power transmission control circuit 150 and the pulse output circuit 160 supply pulse signals to the switching devices S1 and S2 in such a way as to alternately turn on the switching devices S1 and S2. As a result, DC power is converted into AC power.

In this example, the output time ratio of the output voltage V can be adjusted by adjusting the duty ratios (that is, ratios of a period for which each pulse signal is turned on to one period) of the pulse signals. The AC power input to the power transmission antenna 140 can thus be adjusted.

Figure 12A:
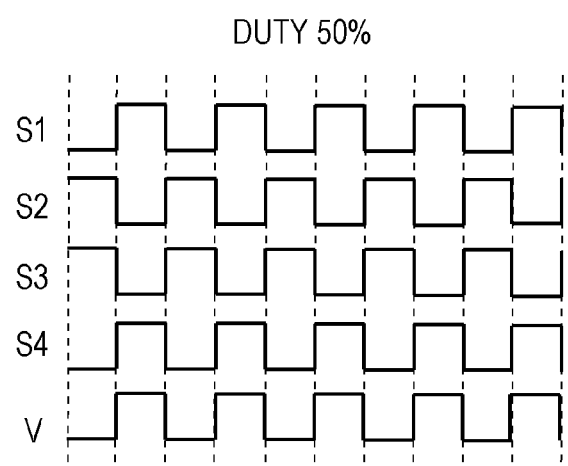
FIG. 12A is a diagram illustrating an example of waveforms of the pulse signals input to the switching devices and the output voltage at a time when duty ratios of the pulse signals are 0.5 (50%)
Figure 12B:
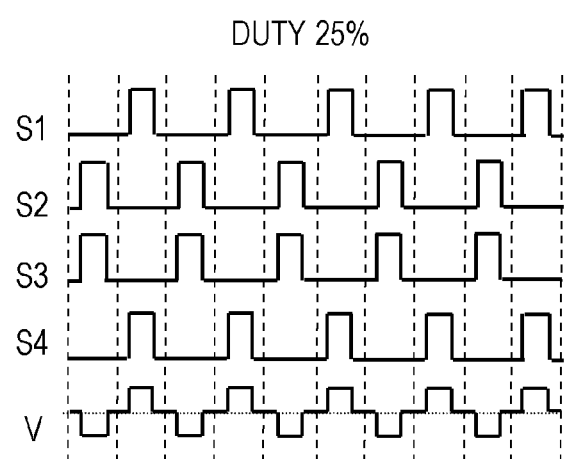
FIG. 12B is a diagram illustrating an example of the waveforms of the pulse signals input to the switching devices and the output voltage at a time when the duty ratios of the pulse signals are 0.25 (25%)

FIGS. 12A and 12B are diagrams illustrating duty control. FIG. 12A illustrates an example of waveforms of the pulse signals input to the switching devices S1 to S4 and the output voltage V at a time when the duty ratios of the pulse signals are 0.5 (50%). FIG. 12B illustrates an example of waveforms of the pulse signals input to the switching devices S1 to S4 at a time when the duty ratios of the pulse signals is 0.25 (25%). As illustrated in FIGS. 12A and 12B, the output time ratio of the voltage V (that is, a ratio of a period for which the voltage V is not zero to one period) can be changed by changing the duty ratios. As a result, the amplitude of the voltage of the AC power received by the power reception antenna 310 can be changed. Such pulse signals having different duty ratios are generated, for example, by the pulse output circuit 160 including a PWM control circuit. The duty ratios are adjusted within a range of 0% to 50%. When the duty ratios are 50%, the amplitude of the voltage to be transmitted becomes largest, and when the duty ratios are 0%, the amplitude of the voltage to be transmitted becomes smallest. Such duty control can be applied when the full-bridge inverter circuit illustrated in FIG. 9 is used.

The power transmission control circuit 150 can adjust the level of the voltage of the AC power output from the power transmission inverter circuit 130 using the above method. In the present embodiment, when changing the load instruction value, the power control apparatus 500 updates the control parameter for the power transmission apparatus 100 and transmits the control parameter to the power transmission apparatus 100. The power transmission apparatus 100 changes voltage output from the power transmission inverter circuit 130 on the basis of the updated control parameter. As a result, even when the operation state of the load 410 is suddenly changed, a desired operation state can be immediately achieved.

Figure 13A:
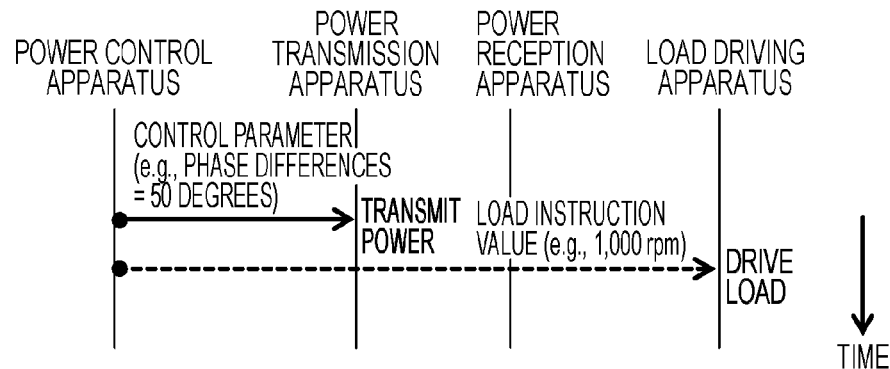
FIG. 13A is a diagram illustrating a first example of timings at which a load instruction value and a control parameter are transmitted in the first embodiment.
Figure 13B:
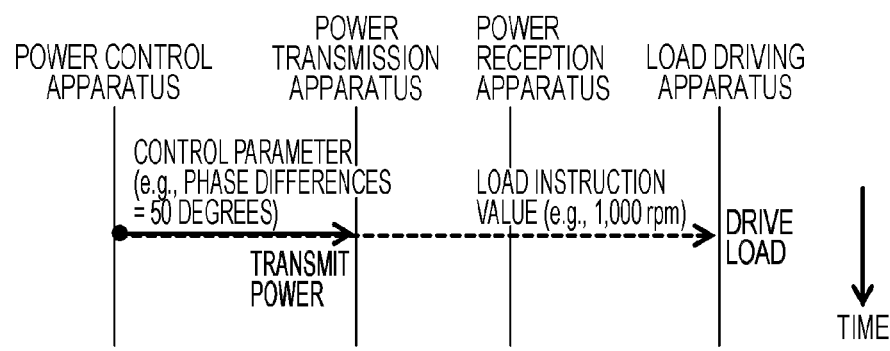
FIG. 13B is a diagram illustrating a second example of the timings at which the load instruction value and the control parameter are transmitted in the first embodiment.
Figure 13C:
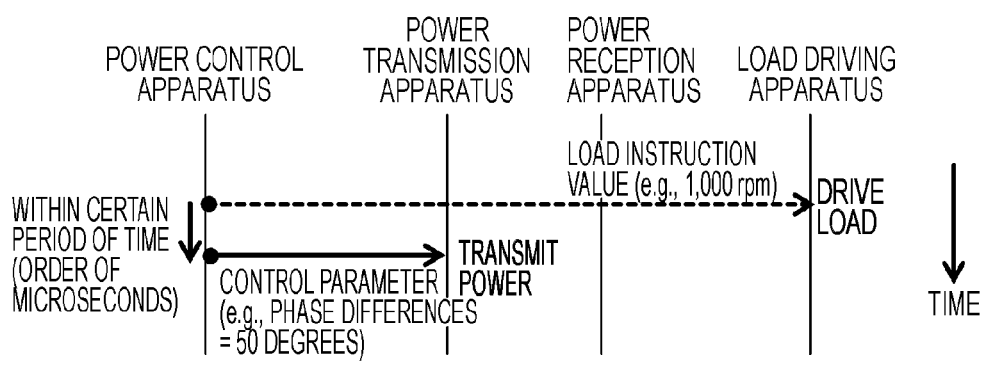
FIG. 13C is a diagram illustrating a third example of the timings at which the load instruction value and the control parameter are transmitted in the first embodiment.

FIGS. 13A to 13C are diagrams illustrating patterns of timings at which the load instruction value and the control parameter are transmitted in the present embodiment. It is assumed here as an example that the load instruction value is the rotational speed of the motor (e.g., 1,000 rpm) and the control parameter is the phase differences between the pulse signals (e.g., 50 degrees).

In the example illustrated in FIG. 13A, the power control apparatus 500 transmits the updated control parameter to the power transmission apparatus 100 and then transmits the updated load instruction value to the load driving apparatus 400. The power transmission control circuit 150 determines the voltage of the first AC power on the basis of the control parameter and drives the power transmission inverter circuit 130 before the load 410 is driven on the basis of the updated load instruction value. As a result, the load 410 can rapidly achieve a desired operation state.

In the example illustrated in FIG. 13B, the power control apparatus 500 simultaneously outputs the updated control parameter and the updated load instruction value to the power transmission apparatus 100 and the load driving apparatus 400, respectively. In this case, transmission of power based on the updated control parameter and driving of the load 410 based on the updated load instruction value substantially simultaneously start. In this case, too, the load 410 can rapidly achieve a desired operation state.

In the example illustrated in FIG. 13C, the power control apparatus 500 transmits the updated load instruction value to the load driving apparatus 400 and then transmits the updated control parameter to the power transmission apparatus 100. The power transmission control circuit 150 determines the voltage of the first AC power on the basis of the transmitted control parameter after the load 410 is driven on the basis of the updated load instruction value. That is, a state of transmission of power is changed after a driving state of the load 410 is changed. In this case, a time taken until how to control the inverter circuit 130 is changed after the driving state of the load 410 is changed is set to be shorter (e.g., order of microseconds) than a time interval in the feedback control in the example of the related art (e.g., several milliseconds). As a result, a desired operation state can be achieved in a shorter period of time than a time taken when only the feedback control in the example of the related art is performed.

Next, a specific example of an operation for updating the load instruction value and the control parameter will be described.

When the operation load to be achieved by the load driving apparatus 400 changes, the main control circuit 550 refers to the table in which the load instruction value and the control parameter are associated with each other and stored and updates the control parameter. The table is stored in the memory 570 of the power control apparatus 500.

Figure 14A:
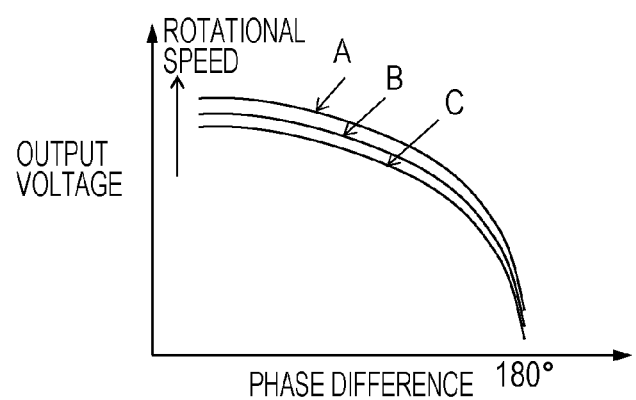
FIG. 14A is a diagram illustrating differences in a relationship between the control parameter (phase differences in this example) and the output voltage depending on a model of a load driving apparatus.

FIG. 14A is a diagram illustrating differences in a relationship between the control parameter (phase differences in this example) and the output voltage depending on a model (A, B, or C) of the load driving apparatus 400 or the rotational speed. The power control apparatus 500 performs a desired operation in accordance with an instruction from the user or a predetermined program while switching the load driving apparatus 400 (model A, B, or C) to be driven or changing the rotational speed of the load 410 (motor in this example). The control parameter for obtaining a desired output voltage varies depending on the model or the rotational speed. The main control circuit 550 in the present embodiment, therefore, refers to a different table depending on the model of the load driving apparatus 400 and determines a control parameter corresponding to the load instruction value (e.g., rotational speed).

Figure 14B:
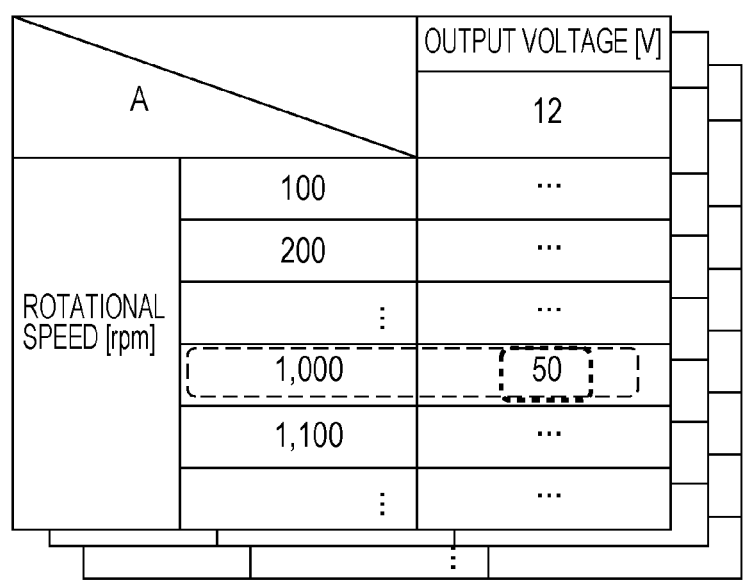
FIG. 14B is a diagram illustrating an image of a table stored in a memory.

FIG. 14B is a diagram illustrating an image of the table stored in the memory 570. The table illustrated in FIG. 14B specifies relationships between the rotational speed (load instruction value) of a motor in a load driving apparatus A and a phase difference (control parameter) between two pulse signals supplied to the power transmission inverter circuit 130. FIG. 14B illustrates an example of a case in which the motor of the load driving apparatus A operates at 12 V. When the rotational speed of the motor is changed to, say, 1,000 rpm, the main control circuit 550 refers to the table and updates the control parameter to 50 degrees, which is a phase difference corresponding to 1,000 rpm. The updated control parameter is transmitted to a power transmission apparatus 100, and the power transmission control circuit 150 sets the phase difference between the pulse signals for driving the power transmission inverter circuit 130 to 50 degrees. In the memory 570, the table illustrated in FIG. 14B can be stored for each model of the load driving apparatus 400.

Figure 15:
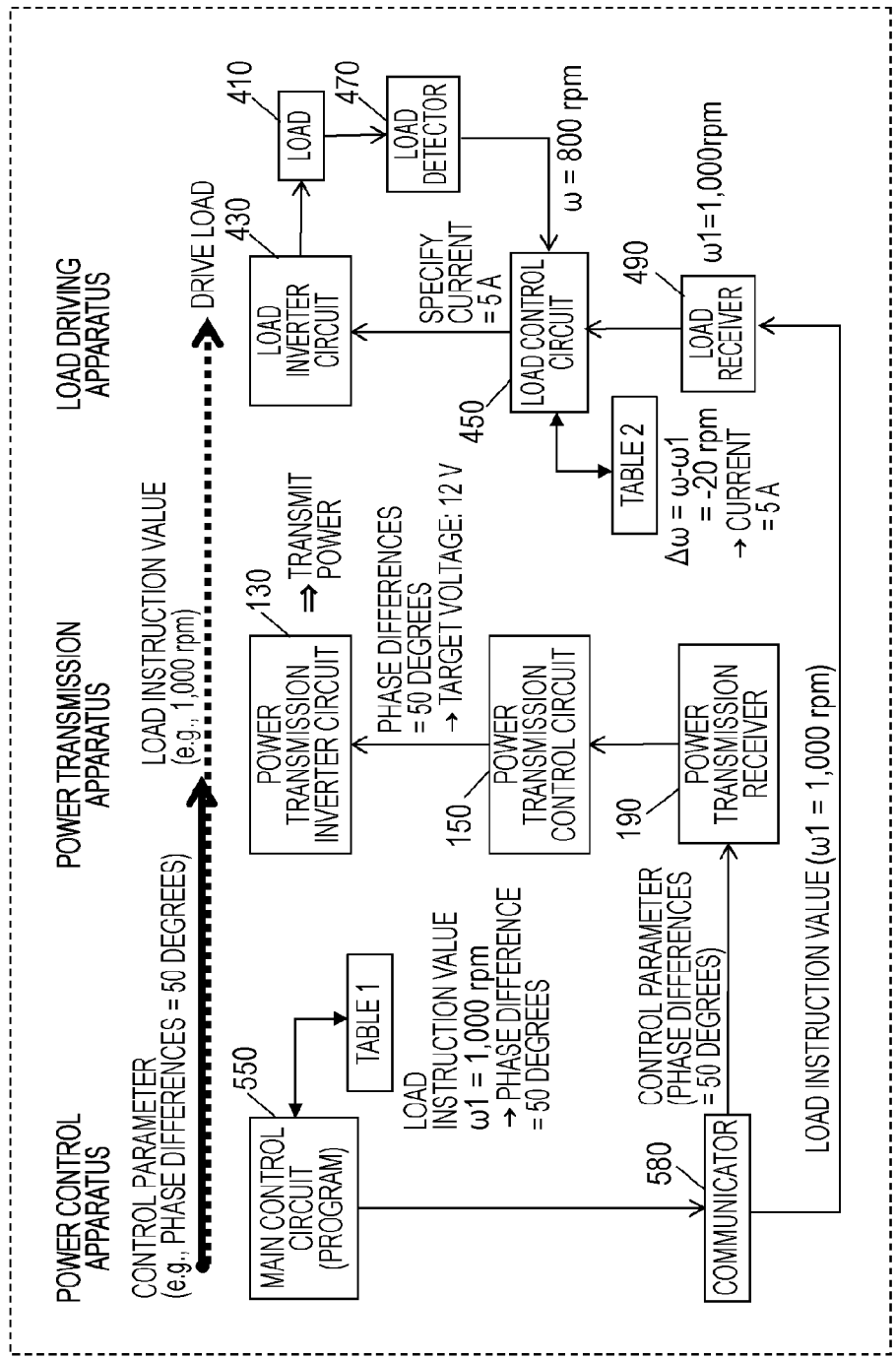
FIG. 15 is a diagram schematically illustrating an operation flow at a time when a power control apparatus changes the load instruction value.

FIG. 15 is a diagram schematically illustrating an operation flow at a time when the power control apparatus 500 changes the load instruction value. Here, an example of a case will be described with reference to FIGS. 16, 17A, and 17B in which the power control apparatus 500 substantially simultaneously transmits the control parameter and the load instruction value.

The main control circuit 550 of the power control apparatus 500 updates the load instruction value in accordance with a certain program and determines a control parameter corresponding to the updated load instruction value while referring to the table.

FIG. 16 is a diagram illustrating an example of an operation procedure specified by the program. In FIG. 16, "number" refers to numbers indicating order of execution of the program. The program specifies an operation flow in which, first, the motor is stopped (#0000: 0 rpm), then "#0100: 100 rpm" lasts for 1 minute and "#0200: 200 rpm" lasts for two minutes, and finally "#0500: 800 rpm" lasts for 1 minute and "#0600: 1,000 rpm" lasts for two minutes. The main control circuit 550 updates the load instruction value and transmits the load instruction value to the load driving apparatus 400 in accordance with the program at timings at which the rotational speed of the motor is changed. When updating the load instruction value, the main control circuit 550 updates the control parameter for the power transmission inverter circuit 130. Alternatively, the user may change the load instruction value by manually operating an input button or a controller without using the program. It is assumed here that the main control circuit 550 transmits the rotational speed ω1=1,000 rpm of the motor to the load driving apparatus 400 as the load instruction value.

The main control circuit 550 refers to the table (referred to as "Table 1") illustrated in FIG. 17A, for example, and determines a control parameter corresponding to the rotational speed of 1,000 rpm. In the example illustrated in FIG. 17A, the control parameter is phase differences between pulse signals, and a value corresponding to 1,000 rpm is 50 degrees. The main control circuit 550, therefore, updates the phase differences, which are the control parameter, to 50 degrees. The communicator 580 then transmits the control parameter (phase differences=50 degrees) to the power transmission receiver 190 and the load instruction value (ω1=1,000 rpm) to the load receiver 490.

The power transmission control circuit 150 drives the power transmission inverter circuit 130 through the pulse output circuit 160 on the basis of the control parameter received by the power transmission receiver 190. In this example, by setting the phase differences to 50 degrees, a target voltage of 12 V is achieved. The power transmission control circuit 150 determines the target voltage of 12 V corresponding to the phase differences of 50 degrees while referring to a table, which is not illustrated. Thereafter, the power transmission control circuit 150 sets the control parameter to an initial value (phase differences=50 degrees) and begins to transmit power, and then performs feedback control on the basis of received voltage transmitted from the power reception transmitter 380 such that the voltage of 12 V is maintained. As described above, the feedback control is performed at intervals of several milliseconds. As a result, the output voltage is roughly corrected using the transmitted control parameter and then corrected to a more accurate value through the feedback control.

The load control circuit 450 controls the load inverter circuit 430 through a pulse output circuit 460 on the basis of the load instruction value received by the load receiver 490. At this time, the load control circuit 450 calculates a difference $\Delta\omega=\omega-\omega 1$ between the rotational speed $\omega 1$ indicated by the load instruction value and a rotational speed $\omega$ actually detected by a load detector 470 and determines a current to be supplied to the load 410 in accordance with the difference $\Delta\omega$. As illustrated in FIG. 15, if $\Delta\omega=-20$ rpm, for example, the load control circuit 450 determines a current to be set as 5 A while referring to the table illustrated in FIG. 17B. The load control circuit 450 controls the load inverter circuit 430 using the control parameter for achieving the determined current.

Although the load control circuit 450 determines the current to be supplied to the load 410 on the basis of the load instruction value in the above embodiment, the load control circuit 450 may determine power (second AC power) to be supplied to the load 410 on the basis of the load instruction value, instead. Alternatively, a voltage to be supplied to the load 410 may be determined on the basis of the load instruction value. Alternatively, both the current and the voltage to be supplied to the load 410 may be determined on the basis of the load instruction value.

The load driving apparatus, therefore, may include a load, a load inverter circuit that converts the second DC power into the second AC power, a load receiver that receives the load instruction value from the power control apparatus, and a load control circuit that determines the second AC power on the basis of the load instruction value and that drives the load, instead.

Alternatively, the load driving apparatus may include a load, a load inverter circuit that converts the second DC power into the second AC power, a load receiver that receives the load instruction value from the power control apparatus, and a load control circuit that determines both the voltage and the current of the second AC power on the basis of the load instruction value and that drives the load.

FIG. 18 is a diagram illustrating a more specific example of the table. The table illustrated in FIG. 18 may be saved in advance in the memory 570 of the power control apparatus 500. The table specifies operations of the load 410 in time series. The table specifies start times, end times, rotational speeds of the motor, the amount of change in the rotational speed from previous values, and the control parameter (phase differences θ in this example) of a certain series of operations. "ID" refers to an identifier provided for each operation pattern.

By referring to such a table, the main control circuit 550 can appropriately change the load instruction value (rotational speed) and the control parameter (the amount of phase deviation) in accordance with the operation patterns of the load driving apparatus 400.

Not all the information illustrated in FIG. 18 need to be accumulated in a single table. The information may be divided into a plurality of tables, instead. Relationships between a start time, an end time, and a rotational speed (operation load) may be specified not in a table but in a program. In this case, only relationships between the operation load and the control parameter may be specified in the table. The information stored in the table can vary depending on the type of load driving apparatus 400 or the model of the load driving apparatus 400.

Figure 19A:
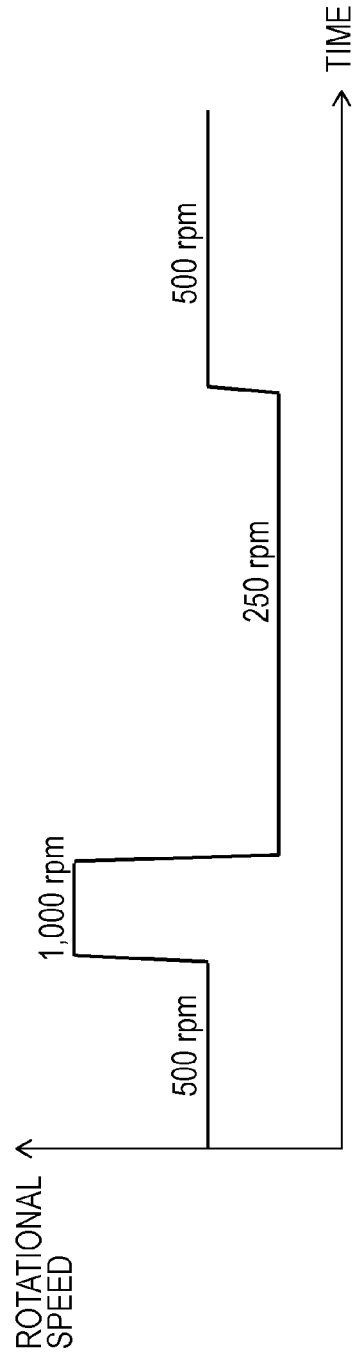
FIG. 19A is a diagram illustrating an example of temporal changes in the rotational speed of a motor in the first embodiment.
Figure 19B:
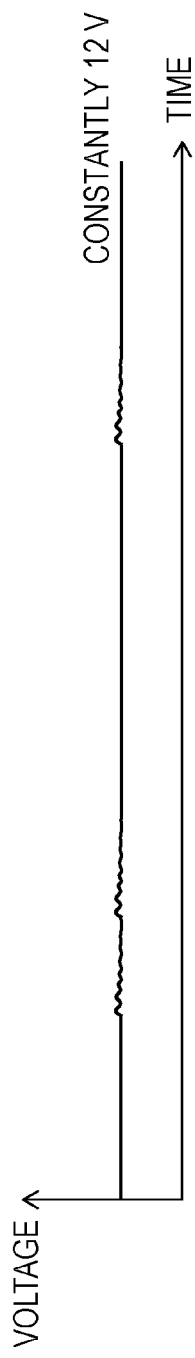
FIG. 19B is a diagram illustrating an example of temporal changes in load voltage in the first embodiment.

FIGS. 19A and 19B are diagrams illustrating an example of an operation and an advantageous effect in the present embodiment. FIG. 19A illustrates an example of temporal changes in the rotational speed of the motor. FIG. 19B illustrates an example of temporal changes in load voltage. When the rotational speed (operation load) of the motor is to be changed, the main control circuit 550 of the power control apparatus 500 determines an optimal control parameter (e.g., phase differences θ) according to the amount of change, while referring to the table illustrated in FIG. 18. The main control circuit 550 then outputs the updated control parameter to the power transmission apparatus 100 and the updated load instruction value to the load driving apparatus 400.

As a result, as illustrated in FIGS. 19A and 19B, a sudden change in the load voltage can be suppressed even when the rotational speed suddenly changes.

Figure 20:
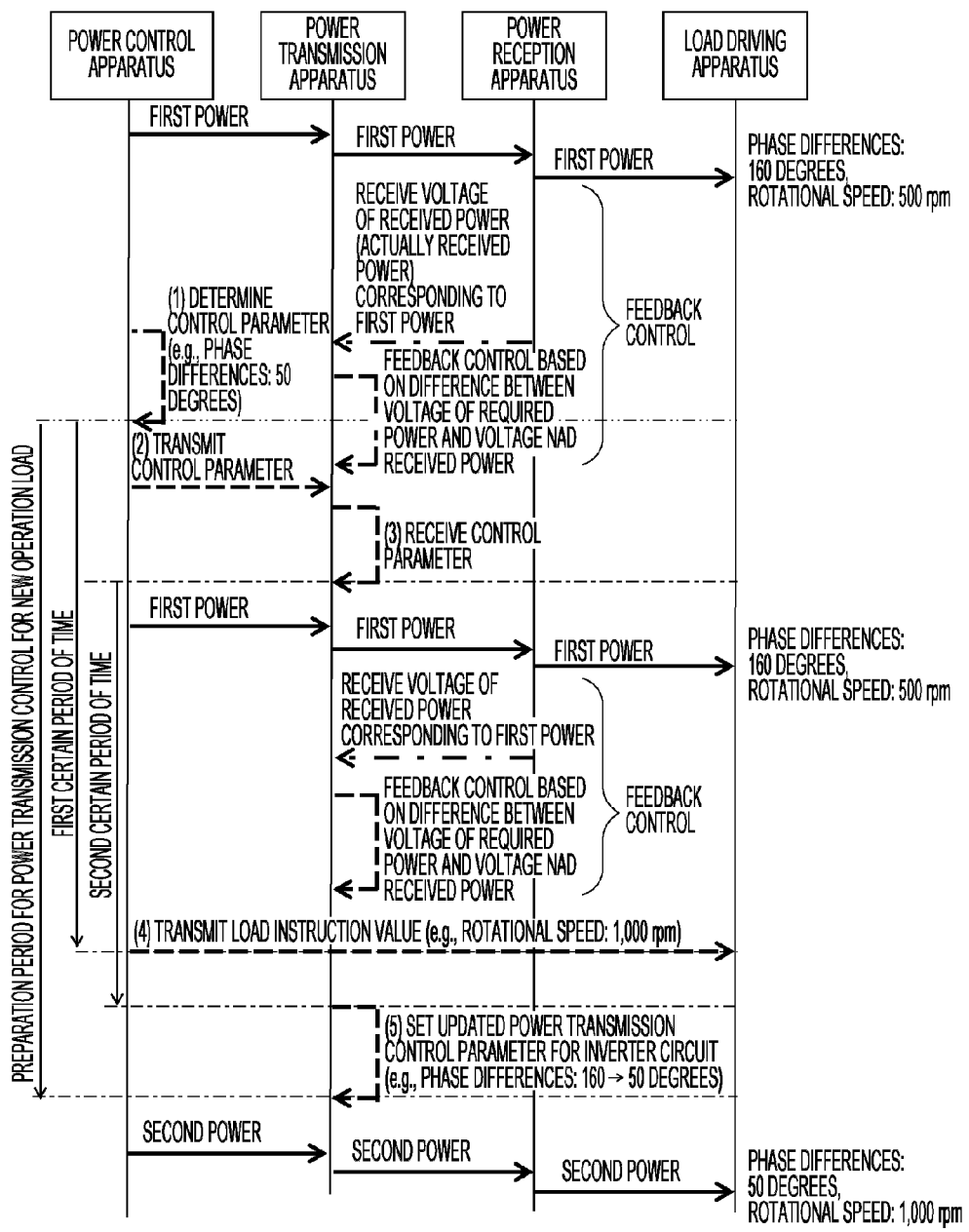
FIG. 20 is a sequence diagram illustrating an example of the operation of the wireless power transmission system in the first embodiment.

FIG. 20 is a sequence diagram illustrating an example of the operation of the wireless power transmission system in the present embodiment. FIG. 20 illustrates an example of a case in which the power control apparatus 500 transmits instruction to the power transmission apparatus 100 and then to the load driving apparatus 400.

First, the power control apparatus 500 transmits power (first power) to the load driving apparatus 400 through the power transmission apparatus 100 and the power reception apparatus 300. It is assumed here, for example, that the phase differences are set to 160 degrees and the rotational speed is set to 500 rpm.

While the first power is being transmitted, the feedback control is performed between the power transmission apparatus 100 and the power reception apparatus 300. The power reception apparatus 300 transmits information regarding a voltage of the received power to the power transmission apparatus 100. The power transmission apparatus 100 adjusts the control parameter such that a difference between a voltage of required power and the voltage of the received power becomes smaller. The feedback control is repeatedly performed at intervals of several milliseconds, for example, as in the above comparison example.

The power control apparatus 500 updates the control parameter used for transmitting power on the basis of the table illustrated in FIG. 18. The phase differences, for example, are updated from 160 degrees to 50 degrees. The power control apparatus 500 transmits the updated control parameter to the power transmission apparatus 100. The power control apparatus 500 determines the updated control parameter and, a certain period of time (first certain period of time) later, transmits the load instruction value (the rotational speed of the motor of 1,000 rpm) to the load driving apparatus 400. As a result, the load driving apparatus 400 changes the control parameter of the load inverter circuit 430 in such a way as to achieve the rotational speed of 1,000 rpm indicated by the received load instruction value.

Upon receiving the control parameter from the power control apparatus 500, the power transmission apparatus 100 waits until a certain period of time (second period of time) elapses. The feedback control, meanwhile, continues. After the second certain period of time elapses, the power transmission apparatus 100 drives the power transmission inverter circuit 130 using the updated control parameter. In this example, the phase differences between pulse signals are changed from 160 degrees to 50 degrees. As a result, transmission of second power, whose voltage level is different from that of the first power, starts. The second power is transmitted with the phase differences of 50 degrees, and the load 410 is driven with the rotational speed of 1,000 rpm. The feedback control continues to be performed at intervals of several milliseconds.

In this example, a period starting with the determination of the control parameter made by the power control apparatus 500 and ending with the actual setting of the control parameter to the power transmission inverter circuit 130 performed by the power transmission apparatus 100 can be seen as a preparation period for power transmission control for the new operation load. The preparation period is significantly shorter than a time taken to achieve a desired load state in a case in which only the feedback control in the example of the related art is performed.

Figure 21:
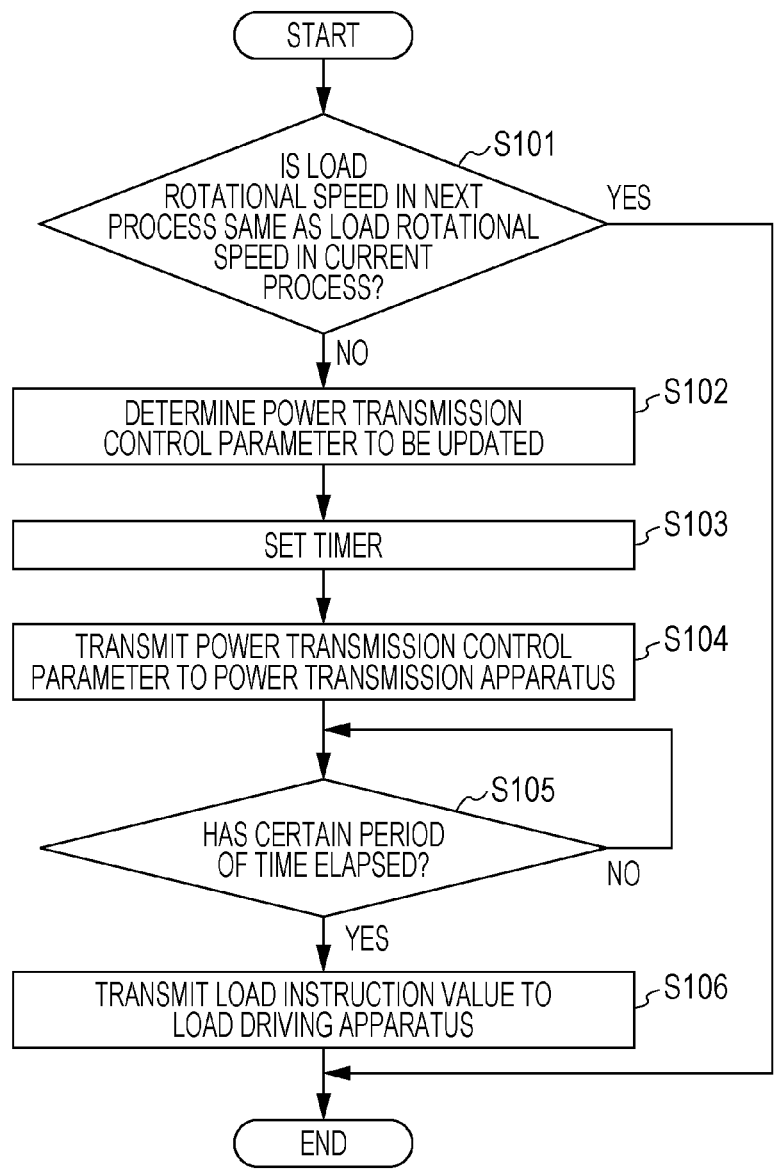
FIG. 21 is a flowchart illustrating the operation of the power control apparatus in the first embodiment.

FIG. 21 is a flowchart illustrating the operation of the power control apparatus 500 in the above example. The main control circuit 550 determines whether a rotational speed of the load 410 in a next process is the same as a rotational speed in a current process (step S101). If the two rotational speeds are different from each other, the main control circuit 550 refers to the table and determines a control parameter corresponding to the next rotational speed (step S102). Next, the main control circuit 550 sets a timer (step S103) and transmits the updated control parameter to the power transmission apparatus 100 (step S104). The main control circuit 550 determines whether the certain period of time (first certain period of time) has elapsed since the timer was set (step S105). When the first certain period of time has elapsed, the main control circuit 550 transmits the load instruction value to the load driving apparatus 400 (step S106).

Figure 22:
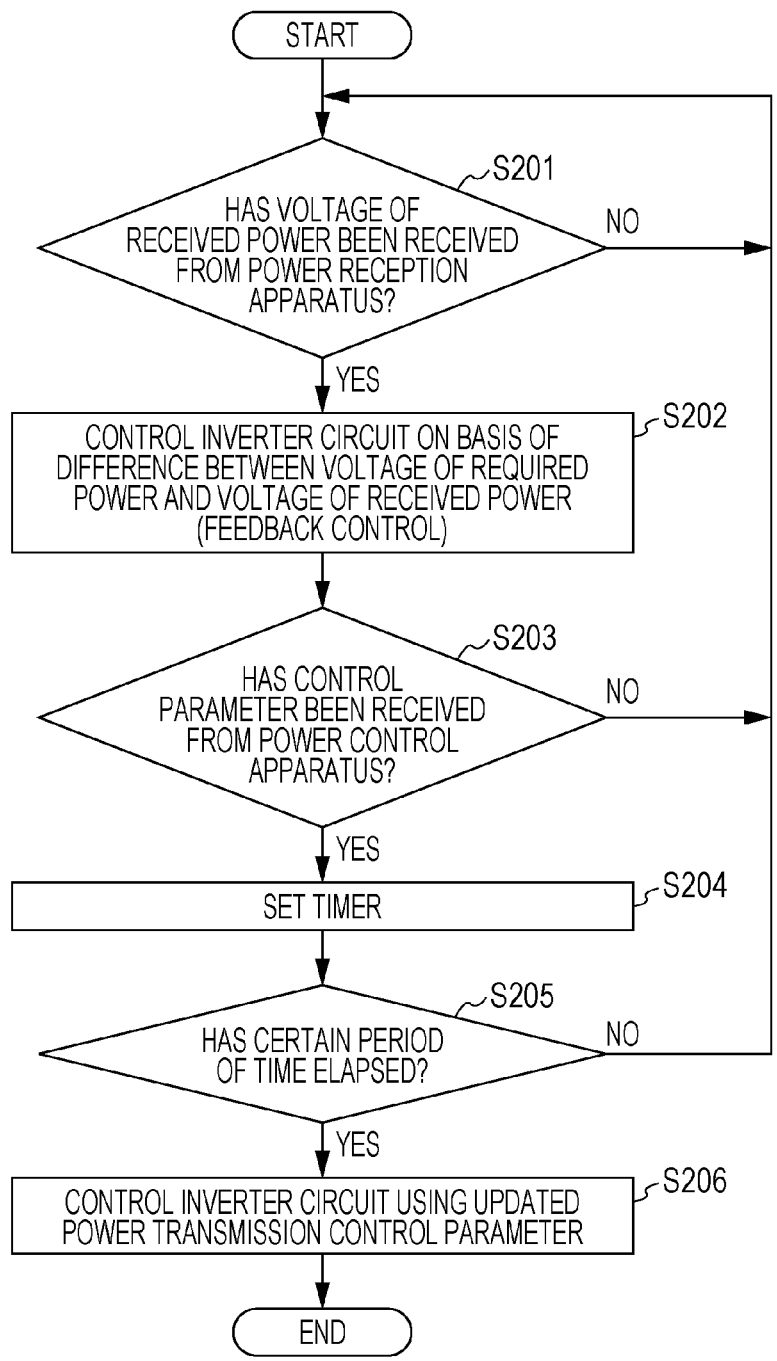
FIG. 22 is a flowchart illustrating the operation of a power transmission apparatus in the first embodiment.

FIG. 22 is a flowchart illustrating the operation of the power transmission apparatus 100 in the above example. The power transmission control circuit 150 of the power transmission apparatus 100 constantly monitors whether a voltage of the received power has been received from the power reception apparatus 300 (step S201). The power transmission control circuit 150 controls, on the basis of a difference between a voltage of the required power and a voltage of the received power, the power transmission inverter circuit 130 such that the difference becomes smaller (step S202). This operation is the above-described feedback control. The power transmission control circuit 150 determines whether the control parameter has been received from the power control apparatus 500 (step S203). If not, the operation returns to step S201. If the control parameter has been received, the power transmission control circuit 150 sets the timer (step S204). The power transmission control circuit 150 then determines whether the certain period of time (second certain period of time) has elapsed (step S205). When the second certain period of time has elapsed, the power transmission control circuit 150 controls the inverter circuit 130 using the updated control parameter (step S206).

As a result of the above operation, a time taken to achieve a desired operation when the operation state of the load 410 changes becomes shorter than in the above comparison example. The above operation is an example, and the order of steps or the like may be changed as necessary.

Next, modifications of the present embodiment will be described.

FIG. 23 is a diagram illustrating a table according to a modification. The table in the power control apparatus 500 may include information regarding a target voltage to be received. The main control circuit 550 transmits the target voltage to be received to the power transmission apparatus 100 along with the control parameter. In this example, the power transmission apparatus 100 need not determine the target voltage to be received.

Figure 24:
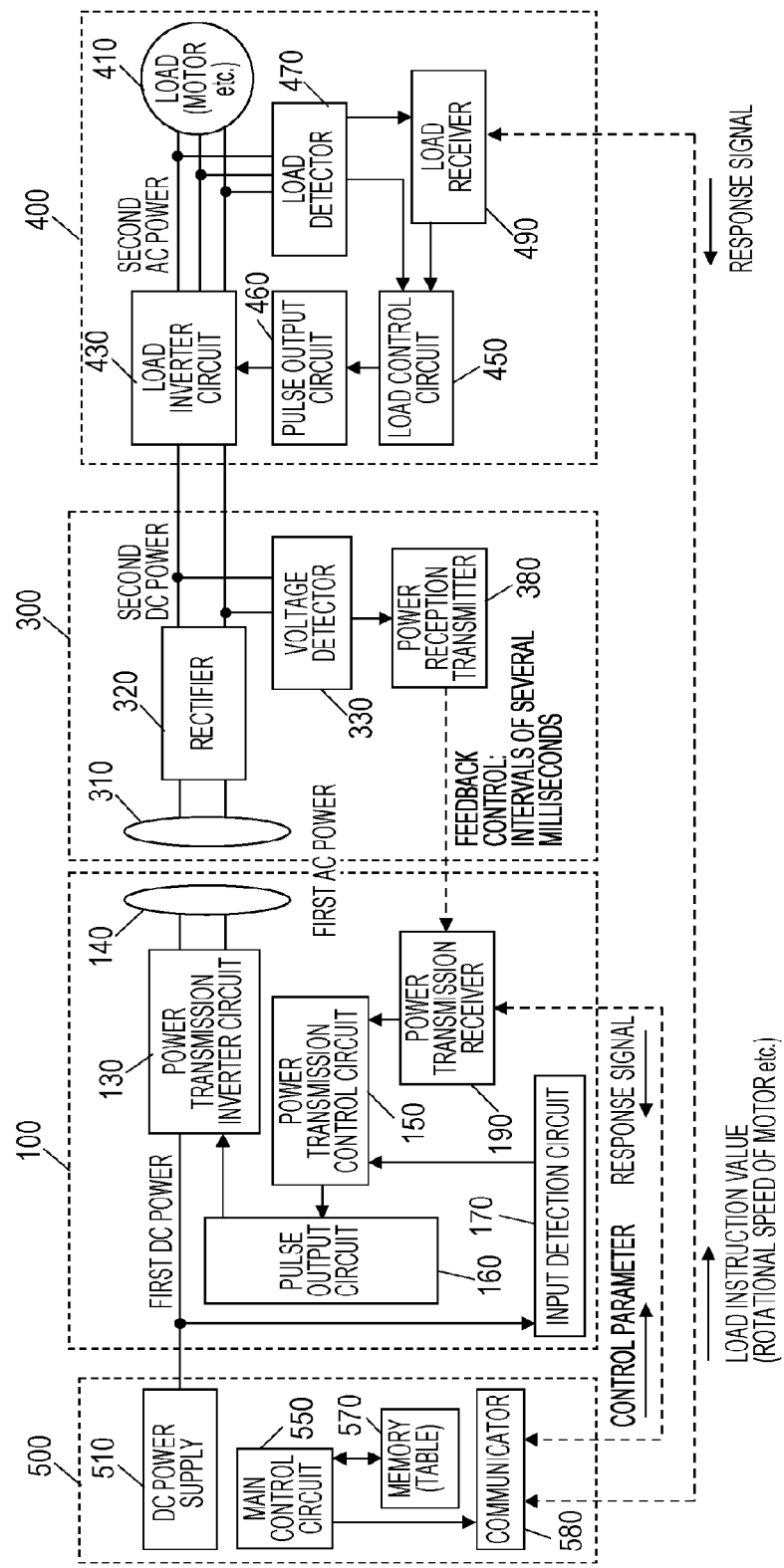
FIG. 24 is a diagram illustrating a configuration in a modification of the first embodiment.

FIG. 24 is a diagram illustrating a configuration according to another modification of the present embodiment. In this modification, the power transmission apparatus 100 further includes an input detection circuit 170. The input detection circuit 170 detects a current input to the power transmission inverter circuit 130 and transmits information regarding the current to the power transmission control circuit 150. The power transmission control circuit 150 adjusts a dead time of the power transmission inverter circuit 130 in accordance with the current. The dead time refers to a time for which two switching devices that are not simultaneously turned on are turned off. By decreasing the dead time as the input current increases, an efficient operation can be performed. If the dead time changes, the amplitude of the first AC voltage output from the power transmission inverter circuit 130 changes and the power transmission control circuit 150 adjusts the control parameter in accordance with the dead time.

Second Embodiment

Next, a wireless power transmission system according to a second embodiment of the present disclosure will be described. The wireless power transmission system in the present embodiment is different from the wireless power transmission system in the first embodiment in that one or more relay apparatuses 200 are provided between the power transmission apparatus 100 and the power reception apparatus 300.

Figure 25:
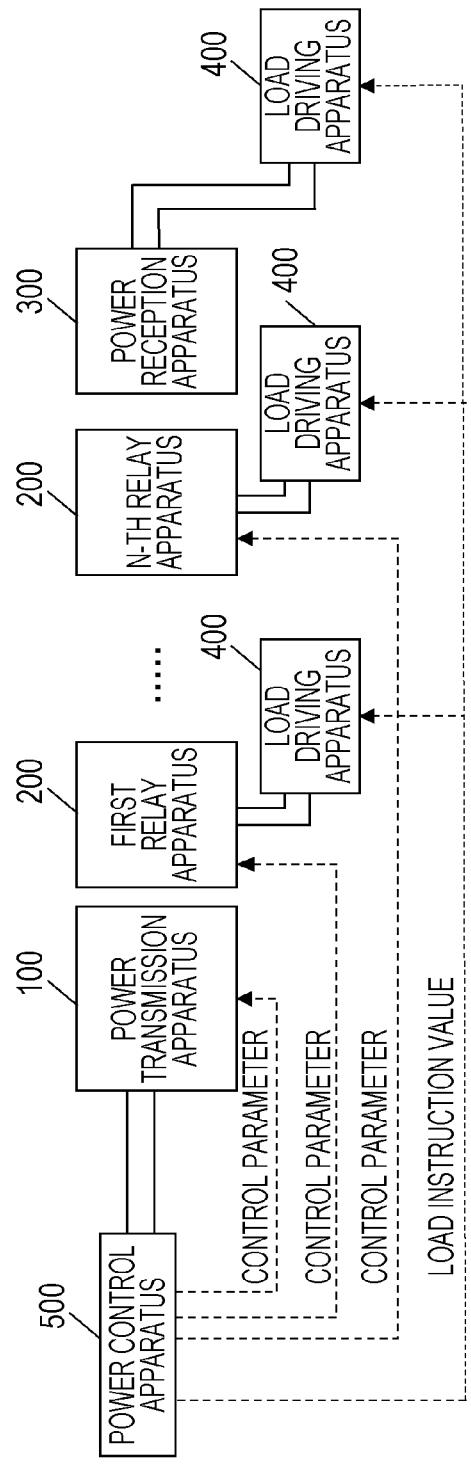
FIG. 25 is a diagram illustrating a schematic configuration of a wireless power transmission system in a second embodiment.

FIG. 25 is a diagram illustrating a schematic configuration of the wireless power transmission system according to the second embodiment. FIG. 25 illustrates an example of a configuration in which N (N is an integer equal to or larger than 2) relay apparatuses 200 are provided between the power transmission apparatus 100 and the power reception apparatus 300. If the wireless power transmission system in the present disclosure is applied to a device including a large number of movable units, such as the robot arm illustrated in FIG. 1, the configuration illustrated in FIG. 25 is effective. The number of relay apparatuses 200 is not limited to two or more, but may be one, instead.

As with the power reception apparatus 300, each relay apparatus 200 is connected to a load driving apparatus 400 (e.g., includes a motor). The N relay apparatuses 200 sequentially relay AC power wirelessly transmitted from the power transmission apparatus 100 to transmit the AC power to the power reception apparatus 300.

In the example illustrated in FIG. 25, the power control apparatus 500 transmits a control parameter to each of the power transmission apparatus 100 and the plurality of relay apparatuses 200 and a load instruction value to each of the plurality of load driving apparatuses 400. As a result, the same control as in the first embodiment is performed when the load instruction value for each load driving apparatus 400 is changed.

The load instruction value may be transmitted to a receiver in each of the relay apparatuses 200 and the power reception apparatus 300 connected to the load driving apparatuses 400. In this case, the load instruction value is transmitted to a load receiver 490 from the power control apparatus 500 through the corresponding relay apparatuses 200 or the power reception apparatus 300. In this case, too, the load instruction value is interpreted to be transmitted from a transmitter (communicator 580) of the power control apparatus 500 to the load receiver 490.

Figure 26:
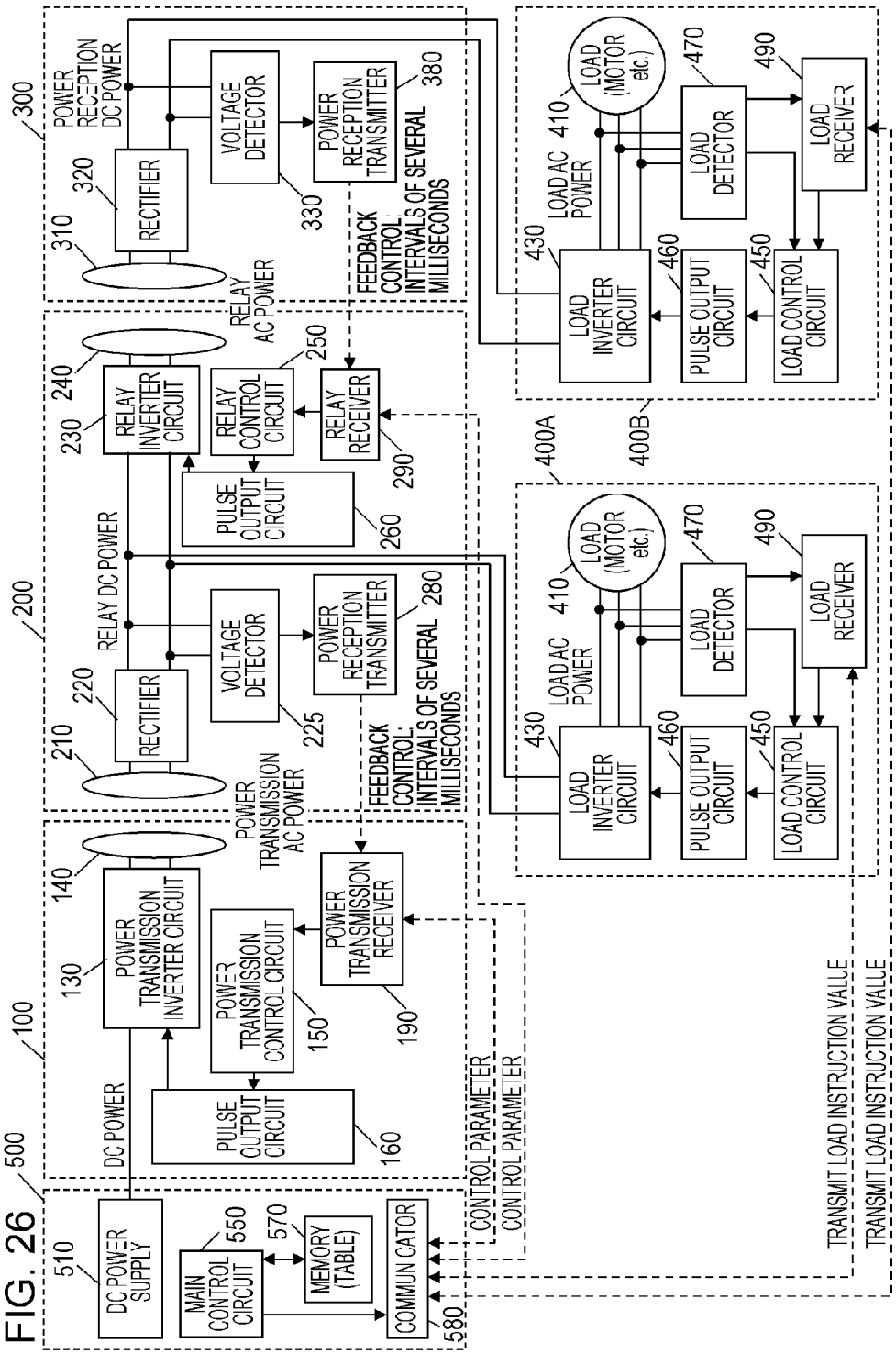
FIG. 26 is a block diagram illustrating a more detailed configuration of the wireless power transmission system in the second embodiment.

FIG. 26 is a block diagram illustrating a more detailed configuration of the wireless power transmission system in the present embodiment. An example in which the number of relay apparatuses 200 is one will be described here for the sake of simplicity. As illustrated in FIG. 26, in this wireless power transmission system, the relay apparatus 200 is provided between the power transmission apparatus 100 and the power reception apparatus 300. A load driving apparatus 400A is connected to the relay apparatus 200, and a load driving apparatus 400B is connected to the power reception apparatus 300. The power control apparatus 500, the power transmission apparatus 100, the power reception apparatus 300, and the load driving apparatuses 400A and 400B have the same configurations as in the first embodiment.

As with the power transmission apparatus 100, the relay apparatus 200 includes a power transmission antenna 240, a relay inverter circuit 230, a relay control circuit 250, a pulse output circuit 260, and a relay receiver 290. As with the power reception apparatus 300, the relay apparatus 200 includes a power reception antenna 210, a rectifier 220, a voltage detector 225, and a relay transmitter 280. These components of the relay apparatus 200 have the same functions as the corresponding components of the power transmission apparatus 100 or the power reception apparatus 300.

The power reception antenna 210 receives power transmission AC power transmitted from the power transmission apparatus 100 in a previous stage. The rectifier 220 converts the power transmission AC power received by the power reception antenna 210 into relay DC power and outputs the relay DC power. The relay inverter circuit 230 converts the relay DC power output from the rectifier 220 into relay AC power and outputs the relay AC power. The power transmission antenna 240 transmits the relay AC power output from the relay inverter circuit 230. The relay control circuit 250 and the pulse output circuit 260 control the relay inverter circuit 230. The relay receiver 290 receives information regarding a voltage transmitted from the power reception transmitter 380. The information regarding a voltage is used in feedback control performed by the relay control circuit 250 to keep the voltage of the power reception DC power constant. The voltage detector 225 detects a voltage of the relay DC power output from the rectifier 220. The relay transmitter 280 transmits information regarding the voltage detected by the voltage detector 225 to the power transmission receiver 190. The information regarding the voltage is used in feedback control performed by the power transmission control circuit 150 to keep the voltage of the relay DC power constant. A method for performing the feedback control is as described in the first embodiment.

The rectifier 220 is connected to the load inverter circuit 430 of the load driving apparatus 400A. The load inverter circuit 430 converts the relay DC power into load AC power and supplies the load AC power to the load 410. The load 410 is thus driven.

The main control circuit 550 of the power control apparatus 500 determines, using the same method as in the first embodiment, a first control parameter to be transmitted to the power transmission apparatus 100 on the basis of a first load instruction value transmitted to the load driving apparatus 400A connected to the relay apparatus 200. Similarly, the main control circuit 550 determines a second control parameter to be transmitted to the relay apparatus 200 on the basis of a second load instruction value transmitted to the load driving apparatus 400B connected to the power reception apparatus 300. As a result, a desired operation state can be achieved in a short period of time when an operation state of each of the load driving apparatuses 400A and 400B is changed.

Next, an example of a wireless power transmission system including a plurality of relay apparatuses 200 will be described.

Figure 27:
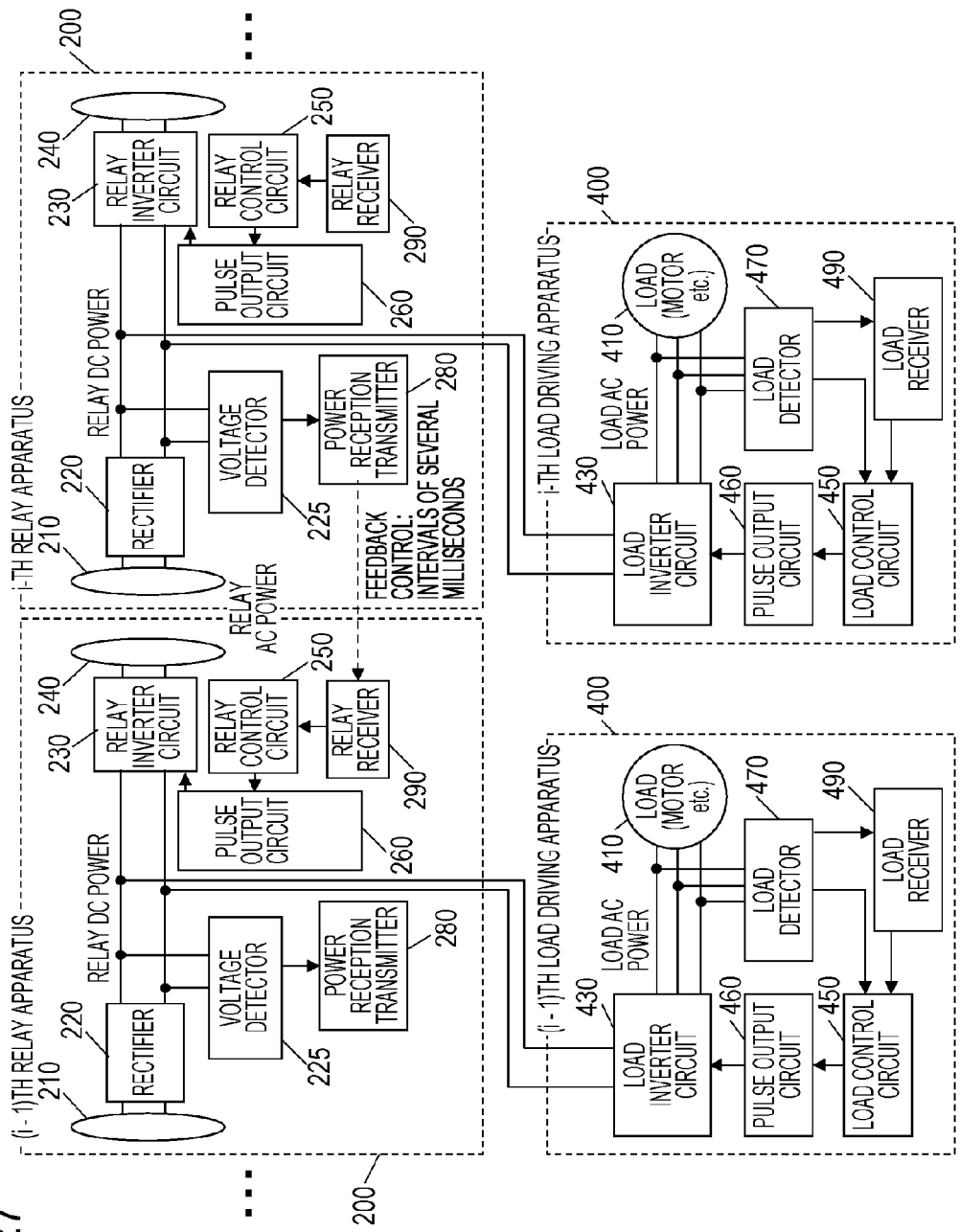
FIG. 27 is a diagram illustrating an example of the configuration of a wireless power transmission system including a plurality of relay apparatuses.

FIG. 27 is a diagram illustrating an example of the configuration of the wireless power transmission system including a plurality of relay apparatuses 200. FIG. 27 illustrates two adjacent relay apparatuses 200 among N (N is an integer equal to or larger than 2) relay apparatuses 200. Each relay apparatus 200 has the same configuration as the relay apparatus 200 illustrated in FIG. 26. Each relay apparatus 200 is connected to a load driving apparatus 400. Although not illustrated in FIG. 27, the power transmission apparatus 100 is provided next to a first relay apparatus 200, and the power reception apparatus 300 is provided next to an N-th relay apparatus 200 as in FIG. 26.

The main control circuit 550 of the power control apparatus 500 determines, using the same method as in the first embodiment, an i-th (i=2 to N) control parameter to be transmitted to an (i−1)th relay apparatus 200 on the basis of an i-th load instruction value transmitted to an i-th load driving apparatus 400 connected to an i-th relay apparatus 200. The main control circuit 550 determines a first control parameter to be transmitted to the power transmission apparatus 100 on the basis of a first load instruction value transmitted to a first load driving apparatus 400 connected to the first relay apparatus 200.

With the above configuration, the same effect as in the first embodiment can be produced even when operation states of a plurality of load driving apparatuses 400 are changed.

As described above, the present disclosure includes wireless power transmission systems described in the following items.

Item 1

A wireless power transmission system including:

a power transmission apparatus;

a power reception apparatus;

a load driving apparatus; and a power control apparatus that supplies power from a direct current power supply to the load driving apparatus through the power transmission apparatus and the power reception apparatus and outputs a load instruction value for the load driving apparatus to the load driving apparatus without using the power transmission apparatus and the power reception apparatus, in which the power control apparatus includes
the direct current power supply,
a main control circuit that updates the load instruction value for the load driving apparatus each time an operation load to be achieved by the load driving apparatus changes, and
a communicator that outputs the updated load instruction value to the load driving apparatus,
in which the power transmission apparatus includes
a power transmission inverter circuit that converts first direct current power supplied from the direct current power supply into first alternating current power, and
a power transmission antenna that wirelessly transmits the first alternating current power obtained as a result of the conversion,
in which the power reception apparatus includes
a power reception antenna that is electromagnetically coupled with the power transmission antenna and receives the transmitted first alternating current power, and
a rectifier that converts the received first alternating current power into second direct current power,
in which the load driving apparatus includes
a load,
a load inverter circuit that converts the second direct into second alternating current power,
a load receiver that receives the load instruction value from the power control apparatus, and
a load control circuit that determines a current of the second alternating current power on the basis of the load instruction value and drives the load,
in which the main control circuit of the power control apparatus updates, if the operation load to be achieved by the load driving apparatus changes, a control parameter for adjusting a voltage of the first alternating current power, the control parameter being used by the power transmission apparatus to convert the first direct current power into the first alternating current power,
in which the communicator of the power control apparatus outputs the updated control parameter to the power transmission apparatus and the updated load instruction value to the load driving apparatus, and
in which the power transmission apparatus further includes a power transmission control circuit that determines the voltage of the first alternating current power on the basis of the updated control parameter from the power control apparatus and that controls the power transmission inverter circuit.

Item 2

The wireless power transmission system according to Item 1,
in which, before the load is driven on the basis of the updated load instruction value, the power transmission control circuit determines the voltage of the first alternating current power on the basis of the control parameter from the power control apparatus and controls the power transmission inverter circuit.

Item 3

The wireless power transmission system according to Item 1,
in which the power transmission control circuit simultaneously outputs the updated control parameter and the updated load instruction value to the power transmission apparatus and the load driving apparatus, respectively.

Item 4

The wireless power transmission system according to Item 1,
in which, if the operation load to be achieved by the load driving apparatus changes, the main control circuit updates the control parameter using a table in which the load instruction value and the control parameter are associated with each other and stored.

Item 5

The wireless power transmission system according to Item 1,
in which the load is a motor.

Item 6

The wireless power transmission system according to Item 1,
in which the second alternating current power includes three-phase alternating current power.

Item 7

The wireless power transmission system according to any of Items 1 to 6,
in which the power reception apparatus further includes a voltage detector that detects a voltage of the second direct current power, and
a power reception transmitter that outputs the detected voltage of the second direct current power to the power transmission apparatus, and
in which the power transmission control circuit performs, using the power transmission inverter circuit, control for eliminating a difference between i) a voltage of the second direct current power corresponding to the first alternating current power based on the control parameter, which is one before the update, and ii) a voltage of the second direct current power corresponding to the first alternating current power based on the updated control parameter.

Item 8

The wireless power transmission system according to any of Items 1 to 7,
in which the power transmission inverter circuit includes four switching devices,
in which the four switching devices include a first switching device pair that outputs, when closed, a voltage having the same polarity as a voltage of the first direct current power supplied from the direct current power supply and a second switching device pair that outputs, when closed, a voltage having a polarity opposite to a polarity of the voltage of the first direct current power,
in which the power transmission control circuit supplies pulse signals for opening or closing the four switching devices to the four switching devices and adjusts the voltage of the first alternating current power output from the power transmission inverter circuit by adjusting a phase difference between two pulse signals supplied to the first switching device pair and a phase difference between two pulse signals supplied to the second switching device pair, and
in which the control parameter is a value indicating a phase difference.

Item 9

The wireless power transmission system according to any of Items 1 to 7,
in which the power transmission control circuit adjusts the voltage of the first alternating current power output from the power transmission inverter circuit by changing frequency of the first alternating current power output from the power transmission inverter circuit, and
in which the control parameter is a value indicating a frequency.

Item 10

The wireless power transmission system according to any of Items 1 to 7, in which the power transmission inverter circuit includes a plurality of switching devices, and in which the power transmission control circuit supplies pulse signals for opening or closing the plurality of switching devices to the plurality of switching devices and adjusts the voltage of the first alternating current power output from the power transmission inverter circuit by adjusting duty ratios of the pulse signals.

A technique in the present disclosure can be used, for example, for devices that need to transmit data while supplying power, such as monitoring cameras and robots.

What is claimed is:

1. A wireless power transmission system comprising:
a power transmission apparatus;
a power reception apparatus;
a load driving apparatus; and
a power control apparatus that supplies power from a direct current power supply to the load driving apparatus through the power transmission apparatus and the power reception apparatus and outputs a load instruction value which decides an operation condition of a load included in the load driving apparatus to the load driving apparatus without using the power transmission apparatus and the power reception apparatus,
wherein the power control apparatus includes
the direct current power supply,
a main control circuit that updates the load instruction value each time an operation load to be achieved by the load driving apparatus changes, and
a communicator that outputs the updated load instruction value to the load driving apparatus,
wherein the power transmission apparatus includes
a power transmission inverter circuit that converts first direct current power supplied from the direct current power supply into first alternating current power, and
a power transmission antenna that wirelessly transmits the converted first alternating current power,
wherein the power reception apparatus includes
a power reception antenna that is electromagnetically coupled with the power transmission antenna and receives the transmitted first alternating current power, and
a rectifier that converts the received first alternating current power into second direct current power,
wherein the load driving apparatus includes
a load,
a load inverter circuit that converts the second direct current power into second alternating current power,
a load receiver that receives the load instruction value from the power control apparatus, and
a load control circuit that determines a current of the second alternating current power on the basis of the load instruction value and drives the load,
wherein the main control circuit updates, if the operation load to be achieved by the load driving apparatus changes, a control parameter for adjusting a voltage of the first alternating current power, the control parameter being used by the power transmission apparatus to convert the first direct current power into the first alternating current power,
wherein the communicator outputs the updated control parameter to the power transmission apparatus and the updated load instruction value to the load driving apparatus, and
wherein the power transmission apparatus further includes a power transmission control circuit that determines the voltage of the first alternating current power on the basis of the updated control parameter and that controls the power transmission inverter circuit using the voltage.

2. The wireless power transmission system according to claim 1,
wherein, before the load is driven on the basis of the updated load instruction value, the power transmission control circuit determines the voltage of the first alternating current power on the basis of the control parameter from the power control apparatus and controls the power transmission inverter circuit.

3. The wireless power transmission system according to claim 1,
wherein the power transmission control circuit simultaneously outputs the updated control parameter and the updated load instruction value to the power transmission apparatus and the load driving apparatus, respectively.

4. The wireless power transmission system according to claim 1,
wherein, if the operation load to be achieved by the load driving apparatus changes, the main control circuit updates the control parameter using a table in which the load instruction value and the control parameter are associated with each other and stored.

5. The wireless power transmission system according to claim 1,
wherein the load is a motor.

6. The wireless power transmission system according to claim 1,
wherein the second alternating current power includes three-phase alternating current power.

7. The wireless power transmission system according to claim 1,
wherein the power reception apparatus further includes
a voltage detector that detects a voltage of the second direct current power, and
a power reception transmitter that outputs the detected voltage of the second direct current power to the power transmission apparatus, and
wherein the power transmission control circuit performs, using the power transmission inverter circuit, control for eliminating a difference between i) a voltage of the second direct current power corresponding to the first alternating current power based on the control parameter, which is one before the update, and ii) a voltage of the second direct current power corresponding to the first alternating current power based on the updated control parameter.

8. The wireless power transmission system according to claim 1,
wherein the power transmission inverter circuit includes four switching devices,
wherein the four switching devices include a first switching device pair that outputs, when closed, a voltage having the same polarity as a voltage of the first direct current power supplied from the direct current power supply and a second switching device pair that outputs, when closed, a voltage having a polarity opposite to a polarity of the voltage of the first direct current power,
wherein the power transmission control circuit supplies pulse signals for opening or closing the four switching devices to the four switching devices and adjusts the voltage of the first alternating current power output from the power transmission inverter circuit by adjusting a phase difference between two pulse signals supplied to the first switching device pair and a phase difference between two pulse signals supplied to the second switching device pair, and wherein the control parameter is a value indicating a phase difference.

9. The wireless power transmission system according to claim 1, wherein the power transmission control circuit adjusts the voltage of the first alternating current power output from the power transmission inverter circuit by changing frequency of the first alternating current power output from the power transmission inverter circuit, and wherein the control parameter is a value indicating a frequency.

10. The wireless power transmission system according to claim 1, wherein the power transmission inverter circuit includes a plurality of switching devices, and wherein the power transmission control circuit supplies pulse signals for opening or closing the plurality of switching devices to the plurality of switching devices and adjusts the voltage of the first alternating current power output from the power transmission inverter circuit by adjusting duty ratios of the pulse signals.

* * * * *